(12) United States Patent
Nam et al.

(10) Patent No.: US 12,477,411 B2
(45) Date of Patent: Nov. 18, 2025

(54) ELECTRONIC DEVICE FOR PERFORMING HANDOVER AND OPERATION METHOD THEREOF

(71) Applicant: Samsung Electronics Co., Ltd., Suwon-si (KR)

(72) Inventors: Kipyo Nam, Suwon-si (KR); Janggun Bae, Suwon-si (KR); Kyoungho Lee, Suwon-si (KR); Sungsick Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 352 days.

(21) Appl. No.: 18/450,750

(22) Filed: Aug. 16, 2023

(65) Prior Publication Data

US 2024/0214881 A1    Jun. 27, 2024

(30) Foreign Application Priority Data

Dec. 22, 2022    (KR) ..................... 10-2022-0181478
Jan. 6, 2023     (KR) ..................... 10-2023-0002144

(51) Int. Cl.
    *H04W 36/00*    (2009.01)
(52) U.S. Cl.
    CPC ... *H04W 36/0061* (2013.01); *H04W 36/0058* (2018.08)
(58) Field of Classification Search
    CPC ..... H04W 48/16; H04W 48/18; H04W 48/02; H04W 48/04; H04W 36/0055;
    (Continued)

(56) References Cited

U.S. PATENT DOCUMENTS

| 2009/0291640 | A1  | 11/2009 | Bhattad et al. |
| 2010/0135245 | A1* | 6/2010  | Zhu ..................... H04W 36/125 |
|              |     |         | 370/331 |

(Continued)

FOREIGN PATENT DOCUMENTS

| CA | 2812944  | C * | 9/2016 | .......... H04W 36/328 |
| CN | 103841548 | A * | 6/2014 | |

(Continued)

*Primary Examiner* — Dung Hong
(74) *Attorney, Agent, or Firm* — Jefferson IP Law, LLP

(57) ABSTRACT

An electronic device and method of operating an electronic device are provided. The electronic device includes a memory storing a forbidden public land mobile network (FPLMN) list including a node to which access of the electronic device is blocked, a communication circuit, and a communication processor configured to receive, through a first node, a handover command signal, search for a second node to which handover is to be performed, based on information included in the handover command signal, identify whether the second node is in the FPLMN list, based on system information broadcast by the second node and including information of multiple public land mobile networks (PLMNs), in case the second node is included in the FPLMN list, transmit a tracking area update (TAU) request signal to the second node, and connect to the second node according to reception of an accept message corresponding to the TAU request signal.

20 Claims, 15 Drawing Sheets

(58) Field of Classification Search
CPC ......... H04W 36/0058; H04W 36/0061; H04W 48/12; H04W 36/14; H04W 60/04; H04W 36/00
See application file for complete search history.

(56) References Cited

U.S. PATENT DOCUMENTS

| | | | | |
|---|---|---|---|---|
| 2011/0045832 | A1* | 2/2011 | Yang | H04W 36/0066 455/436 |
| 2012/0252397 | A1* | 10/2012 | Kumar | H04W 48/16 455/404.1 |
| 2013/0012192 | A1* | 1/2013 | Xi | H04W 36/0064 455/422.1 |
| 2013/0017826 | A1* | 1/2013 | Bergquist | H04W 12/08 455/426.1 |
| 2016/0255565 | A1* | 9/2016 | Kim | H04W 64/006 370/331 |
| 2017/0055194 | A1* | 2/2017 | Cho | H04W 48/02 |
| 2019/0223246 | A1* | 7/2019 | Huang-Fu | H04W 76/18 |
| 2022/0070812 | A1* | 3/2022 | Cheng | H04W 60/04 |
| 2022/0225214 | A1* | 7/2022 | Vamanan | H04W 4/90 |
| 2022/0361058 | A1* | 11/2022 | Shaheen | H04W 36/0058 |
| 2023/0071260 | A1* | 3/2023 | Kim | H04W 36/0061 |
| 2024/0276433 | A1* | 8/2024 | Li | H04W 48/04 |

FOREIGN PATENT DOCUMENTS

| | | | | | |
|---|---|---|---|---|---|
| CN | 110225464 | A | * | 9/2019 | ............ H04W 76/18 |
| CN | 112004264 | A | * | 11/2020 | ............ H04W 60/04 |
| CN | 109005568 | B | * | 7/2021 | ........ H04W 52/0216 |
| CN | 110741688 | B | * | 11/2021 | ............ H04W 48/02 |
| CN | 110536343 | B | * | 1/2022 | ........ H04W 36/0069 |
| KR | 10-2011-0010128 | A | | 1/2011 | |
| KR | 10-2431178 | B1 | | 8/2022 | |
| WO | 2021/237613 | A1 | | 12/2021 | |
| WO | 2022/052034 | A1 | | 3/2022 | |
| WO | WO-2024002963 | A1 | * | 1/2024 | ............ H04W 48/02 |

* cited by examiner

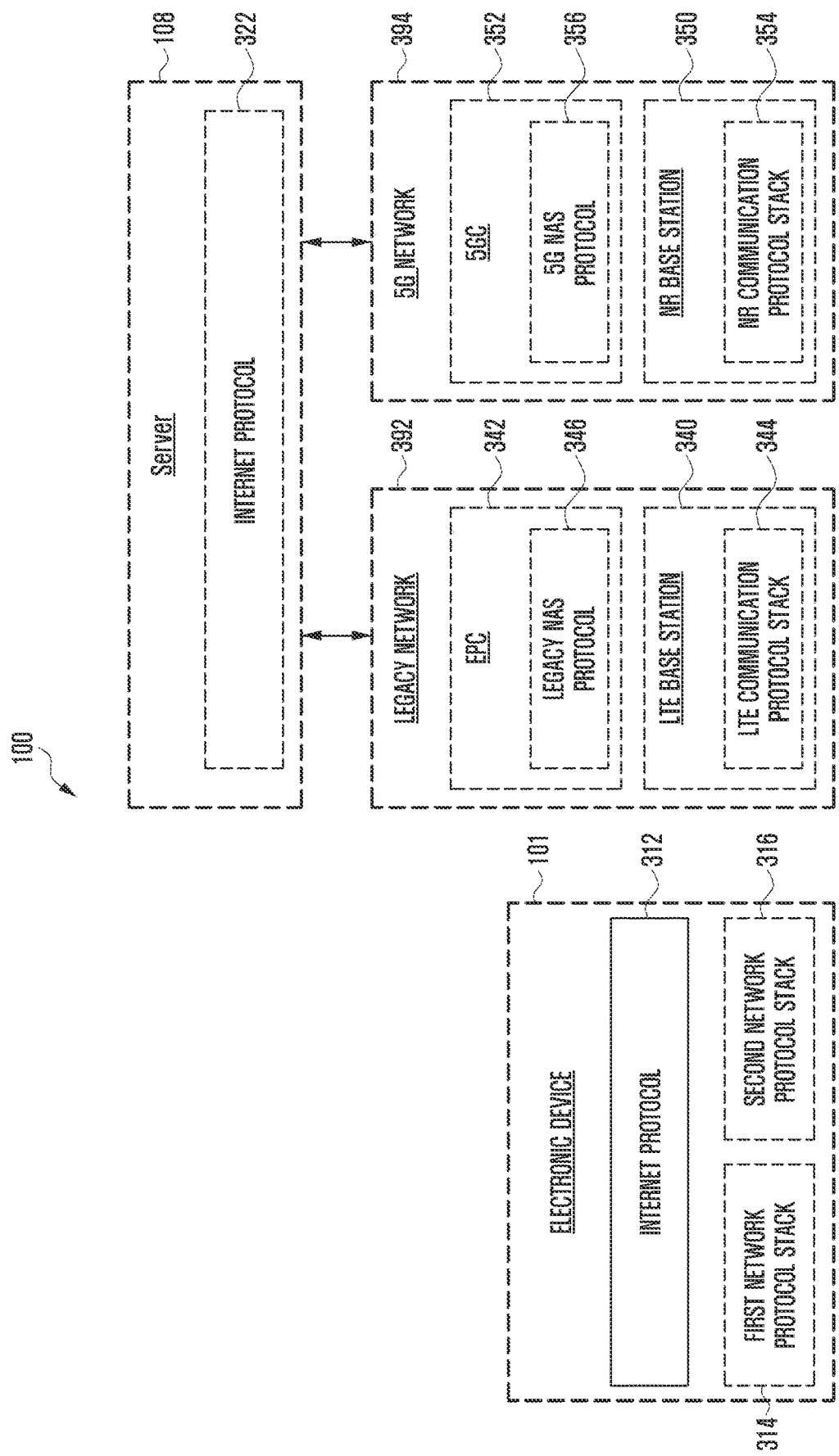

ELECTRONIC DEVICE FOR PERFORMING HANDOVER AND OPERATION METHOD THEREOF

CROSS-REFERENCE TO RELATED APPLICATION(S)

This application is based on and claims priority under 35 U.S.C. § 119(a) of a Korean patent application number 10-2022-0181478, filed on Dec. 22, 2022, in the Korean Intellectual Property Office, and of a Korean patent application number 10-2023-0002144, filed on Jan. 6, 2023, in the Korean Intellectual Property Office, the disclosure of each of which is incorporated by reference herein in its entirety.

BACKGROUND

1. Field

The disclosure relates to an electronic device and an operation method of an electronic device. More particularly, the disclosure relates to an electronic device for performing handover.

2. Description of Related Art

In order to meet wireless data traffic demands increasing after commercialization of the $4^{th}$ generation (4G) communication system, efforts to develop an improved $5^{th}$ generation (5G) communication system or a pre-5G communication system have been made. For this reason, the 5G communication system or the pre-5G communication system is called a beyond 4G network communication system or a post-long term evolution (LTE) system. The 5G communication system is being considered to be implemented in a super-high frequency (e.g., millimeter wave (mmWave)) band (e.g., a band of 6 gigahertz (GHz) or above) other than a band (a band of 6 GHz or below) used in LTE, so as to achieve a higher data transfer rate. In the 5G communication system, technologies including beamforming, massive multiple-input and multiple-output (MIMO), full dimensional MIMO (FD-MIMO), array antennas, analog beamforming, and large scale antennas are being discussed.

An electronic device may receive a measurement configuration from a connected node. The electronic device may measure the quality of a signal broadcast by a node neighboring the connected node, through a frequency band included in a measurement object included in the measurement configuration. When the quality of the signal satisfies a reporting condition included in the measurement configuration, the electronic device may transmit a measurement report to perform handover to the neighboring node.

The node to which the electronic device is to perform handover is a node shared by multiple cellular operators, and may be a node included in a shared network. When the electronic device performs handover to a node included in the shared network, the electronic device may select one operator from among the multiple cellular operators, and transmit a signal including identification information (e.g., public land mobile network (PLMN)) corresponding to the selected operator. However, due to temporary error of the node included in the shared network, the electronic device may attempt to connect to a core network operated by another cellular network operator other than a core network operated by the selected cellular network operator. When there is an attempt to access another core network, the other core network may reject the access of the electronic device, and transmit a message indicating rejection of the access to the electronic device.

The electronic device may, when the electronic device is in a radio resource control (RRC) idle state, in response to reception of the message indicating rejection of the access, add identification information of the cellular network operator having transmitted the message to a forbidden public land mobile network (FPLMN) list including a node forbidding access attempt of the electronic device. When a command of handover to a node included in the FPLMN list is received, the electronic device may not perform handover to the node included in the FPLMN list.

The above information is presented as background information only to assist with an understanding of the disclosure. No determination has been made, and no assertion is made, as to whether any of the above might be applicable as prior art with regard to the disclosure.

SUMMARY

When a node is added to an FPLMN list against the intent of a cellular network or an electronic device, the electronic device may be unable to attempt to access the node included in the FPLMN list.

The electronic device may be able to access the node added to the FPLMN list, or may be unable to access the node added to the FPLMN list. When the electronic device is unable to access the node added to the FPLMN list, the quality of cellular communication may degrade and/or connection of cellular communication may be temporarily released.

Furthermore, when a command of handover to the node added to the FPLMN list is received over a cellular network, the electronic device may release RRC connection and access a previously connected node again. When a command of handover to the node added to the FPLMN list is received again, the electronic device may repeatedly release RRC connection and access a first node (e.g., first node 510 of FIG. 5A). When release of RRC connection and access to the previously connected node are repeatedly performed, the quality of cellular communication may degrade and/or connection of cellular communication may be temporarily released.

Aspects of the disclosure are to address at least the above-mentioned problems and/or disadvantages and to provide at least the advantages described below. Accordingly, an aspect of the disclosure is to provide an electronic device and an operation method of an electronic device.

Additional aspects will be set forth in part in the description which follows and, in part, will be apparent from the description, or may be learned by practice of the presented embodiments.

In accordance with an aspect of the disclosure, an electronic device is provided. The electronic device includes a memory configured to store a forbidden public land mobile network (FPLMN) list including a node to which access of the electronic device is blocked. The electronic device may include a communication circuit. The electronic device may include a communication processor. The communication processor may be configured to receive, through a first node, a handover command signal transmitted by a cellular network. The communication processor may be configured to search for a second node to which handover is to be performed, based on information of the second node included in the handover command signal. The communication processor may be configured to identify whether the second node is included in the FPLMN list, based on system information which is broadcast by the second node and includes information of multiple public land mobile networks (PLMNs). The communication processor may be configured to, in case that the second node is included in the FPLMN list, transmit a tracking area update (TAU) request signal to the second node. The communication processor may be configured to connect to the second node according to reception of an accept message corresponding to the TAU request signal.

In accordance with another aspect of the disclosure, an operation method of an electronic device is provided. The operation method includes receiving, through a first node, a handover command signal transmitted by a cellular network. The operation method of the electronic device may include searching for a second node to which handover is to be performed, based on information of the second node included in the handover command signal. The operation method of the electronic device may include identifying whether the second node is included in an FPLMN list including a node to which access of the electronic device is blocked, based on system information which is broadcast by the second node and includes information of multiple public land mobile networks (PLMNs). The operation method of the electronic device may include, in case that the second node is included in the FPLMN list, transmitting a TAU request signal to the second node. The operation method of the electronic device may include connecting to the second node according to reception of an accept message corresponding to the TAU request signal.

In an electronic device and an operation method of an electronic device according to an embodiment, when a command of handover to a node included in an FPLMN list is received, the electronic device may transmit a TAU request signal to the node included in the FPLMN list. When an accept message corresponding to the TAU request signal is received, the electronic device may perform handover to the node included in the FPLMN list. A situation where the electronic device has received the accept message corresponding to the TAU request signal may correspond to a situation where the electronic device is able to perform access and handover to the node. Therefore, the electronic device may perform handover so as to prevent degradation of communication performance.

In an electronic device and an operation method of an electronic device according to an embodiment, when a command of handover to a node included in an FPLMN list is received, the electronic device may transmit a TAU request signal to the node included in the FPLMN list. When the electronic device fails to receive an accept message corresponding to the TAU request signal, the electronic device may add the node included in the FPLMN list to a list including a node to which a measurement report including the quality of the node is not able to be transmitted for a designated time interval. Therefore, the electronic device may prevent repetition of transmission of a signal requesting a particular service and reception of a reject message.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 3 is a diagram illustrating a protocol stack structure of a network environment of legacy communication and/or 5G communication according to an embodiment of the disclosure;

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
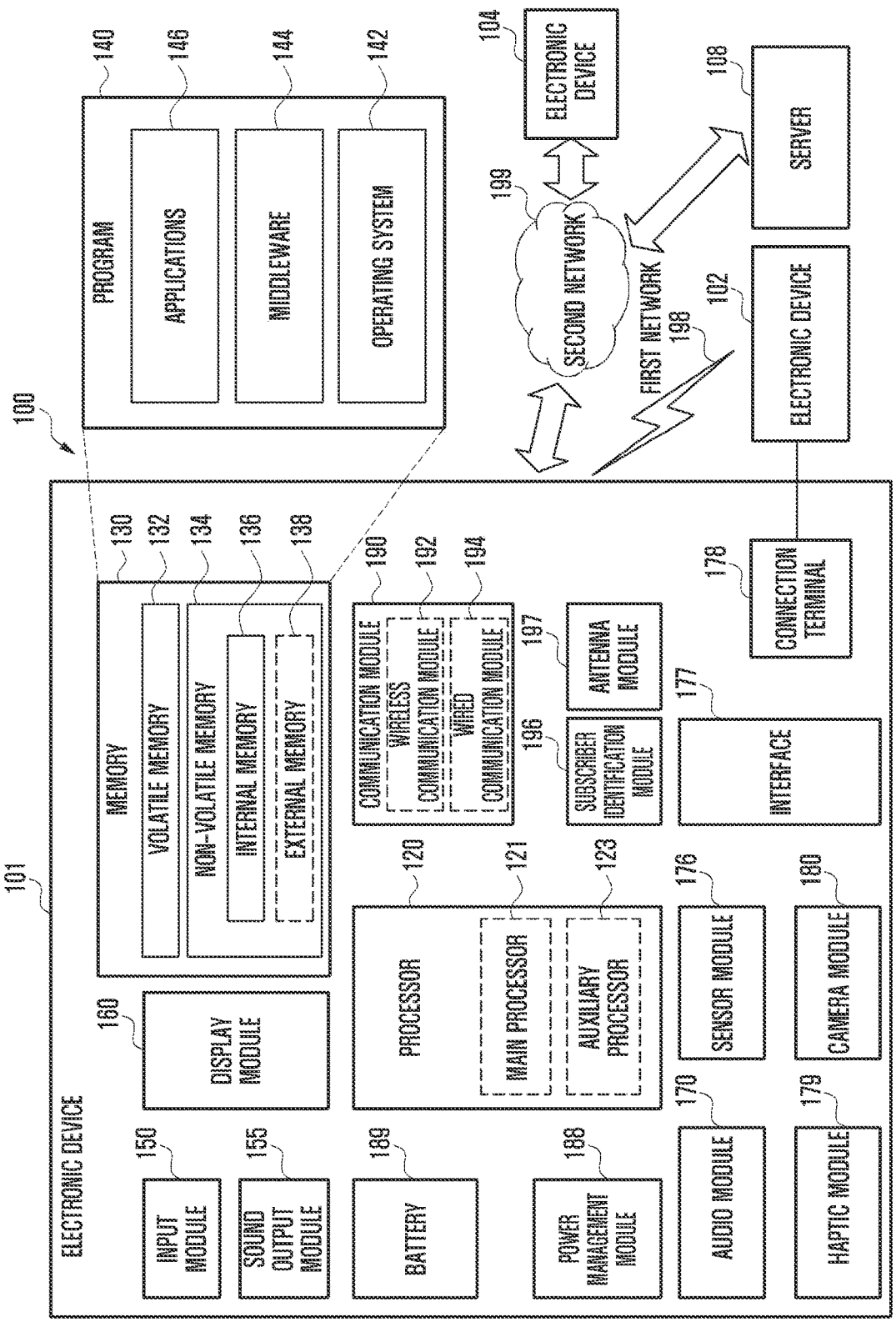
FIG. 1 is a block diagram of an electronic device according to an embodiment of the disclosure.

FIG. 1 is a block diagram illustrating an electronic device in a network environment according to an embodiment of the disclosure.

Referring to FIG. 1, an electronic device 101 in a network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, a memory 130, an input device or input module 150, a sound output device or sound output module 155, a display device or display module 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display module 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display module 160 (e.g., a display).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may load a command or data received from another component (e.g., the sensor module 176 or the communication module 190) in a volatile memory 132, process the command or the data stored in the volatile memory 132, and store resulting data in a non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or applications 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connection terminal 178 may include a connector via which the electronic device 101 may be physically connected with the external electronic device (e.g., the electronic device 102). According to an embodiment, the connection terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 gigabits per second (Gbps) or more) for implementing eMBB, loss coverage (e.g., 164 decibels (dB) or less) for implementing mMTC, or U-plane latency (e.g., 0.5 milliseconds (ms) or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form an mmWave antenna module. According to an embodiment, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices (e.g., electronic devices 102 and 104 or the server 108). For example, if the electronic device 101 should perform a function or a service automatically, or in response to a request from a user or another device, the electronic device 101, instead of, or in addition to, executing the function or the service, may request the one o" mor' external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
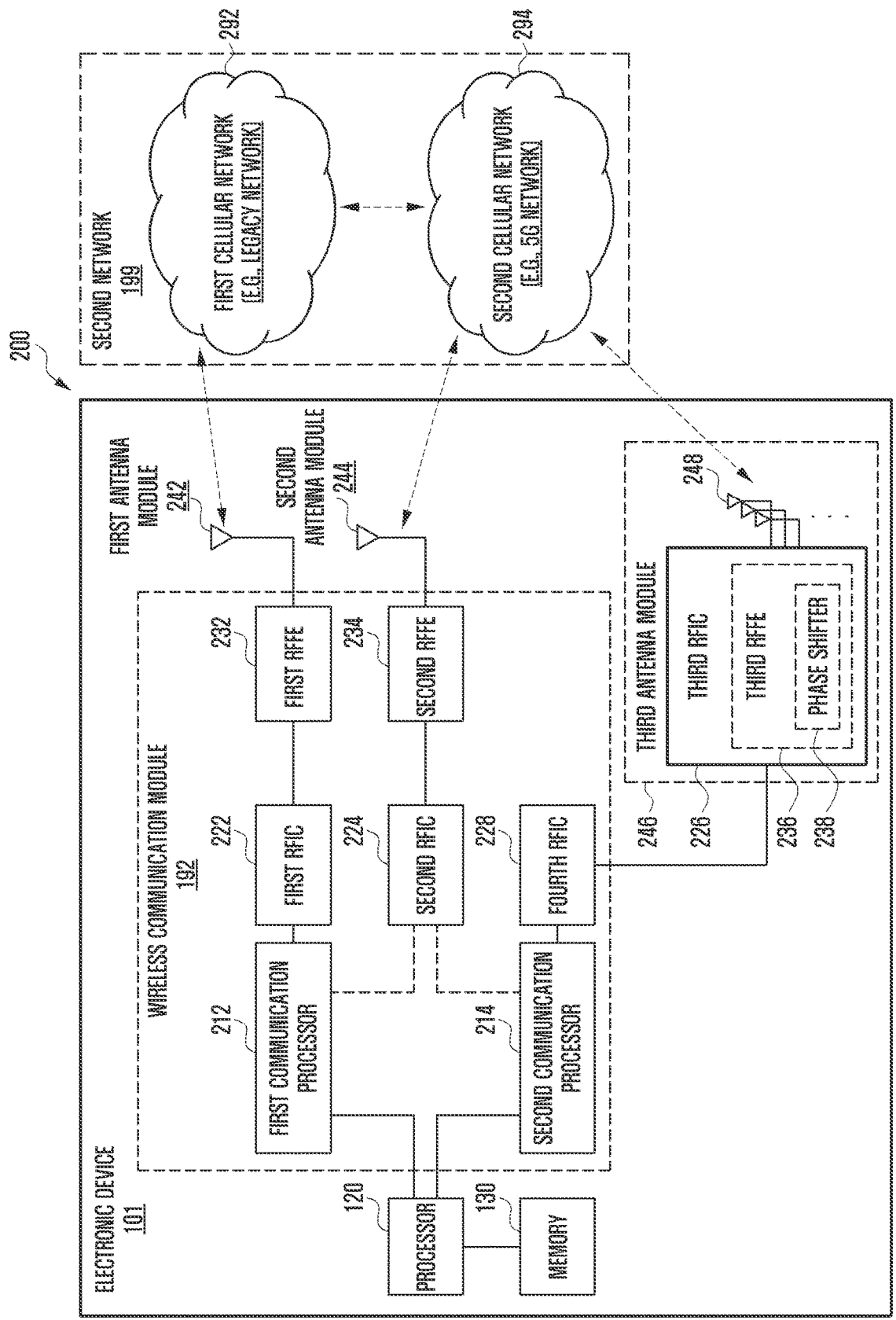
FIG. 2 is a block diagram of an electronic device for supporting legacy network communication and 5G network communication according to an embodiment of the disclosure.

FIG. 2 is a block diagram of an electronic device for supporting legacy network communication and 5G network communication according to an embodiment of the disclosure.

Referring to FIG. 2, block diagram 200 illustrates that an electronic device 101 may include a first communication processor 212, a second communication processor 214, a first radio frequency integrated circuit (RFIC) 222, a second RFIC 224, a third RFIC 226, a fourth RFIC 228, a first radio frequency front end (RFFE) 232, a second RFFE 234, a first antenna module 242, a second antenna module 244, and an antenna 248. The electronic device 101 may further include the processor 120 and the memory 130. The second network 199 may include a first cellular network 292 and a second cellular network 294. According to another embodiment, the electronic device 101 may further include at least one component among the components illustrated in FIG. 1, and the second network 199 may further include at least one other network. According to an embodiment, the first communication processor 212, the second communication processor 214, the first RFIC 222, the second RFIC 224, the fourth RFIC 228, the first RFFE 232, and the second RFFE 234 may be included as at least a part of the wireless communication module 192. According to another embodiment, the fourth RFIC 228 may be omitted or may be included as a part of the third RFIC 226.

The first communication processor 212 may establish a communication channel of a band to be used for wireless communication with the first cellular network 292, and may support legacy network communication via the established communication channel. According to certain embodiments, the first network may be a legacy network including 2G, 3G, 4G, or long term evolution (LTE) network. The second communication processor 214 may establish a communication channel corresponding to a designated band (e.g., approximately 6 GHz to 60 GHz) among bands to be used for wireless communication with the second cellular network 294, and may support 5G network communication via the established channel. According to certain embodiments, the second cellular network 294 may be a 5G network defined in $3^{rd}$ generation partnership project (3GPP). Additionally, according to an embodiment, the first communication processor 212 or the second communication processor 214 may establish a communication channel corresponding to another designated band (e.g., lower than 6 GHz) among bands to be used for wireless communication with the second cellular network 294, and may support 5G network communication via the established channel. According to an embodiment, the first communication processor 212 and the second communication processor 214 may be implemented in a single chip or a single package. According to certain embodiments, the first communication processor 212 or the second communication processor 214 may be implemented in a single chip or a single package, together with the processor 120, the auxiliary 123, or the communication module 190.

In the case of transmission, the first RFIC 222 may convert a baseband signal generated by the first communication processor 212 into a radio frequency (RF) signal in a range of approximately 700 megahertz (MHz) to 3 GHz used for the first cellular network 292 (e.g., a legacy network). In the case of reception, an RF signal is obtained from the first cellular network 292 (e.g., a legacy network) via an antenna (e.g., the first antenna module 242), and may be preprocessed via an RFFE (e.g., the first RFFE 232). The first RFIC 222 may convert the preprocessed RF signal to a baseband signal so that the base band signal is processed by the first communication processor 212.

In the case of transmission, the second RFIC 224 may convert a baseband signal generated by the first communication processor 212 or the second communication processor 214 into an RF signal (hereinafter, a 5G Sub6 RF signal) of a Sub6 band (e.g., lower than 6 GHz) used for the second cellular network 294 (e.g., 5G network). In the case of reception, a 5G Sub6 RF signal is obtained from the second cellular network 294 (e.g., a 5G network) via an antenna (e.g., the second antenna module 244), and may be preprocessed by an RFFE (e.g., the second RFFE 234). The second RFIC 224 may convert the preprocessed 5G Sub6 RF signal into a baseband signal so that the baseband signal is processed by a corresponding communication processor from among the first communication processor 212 or the second communication processor 214.

The third RFIC 226 may convert a baseband signal generated by the second communication processor 214 into an RF signal (hereinafter, a 5G Above6 RF signal) of a 5G Above6 band (e.g., approximately 6 GHz to 60 GHz) to be used for the second cellular network 294 (e.g., 5G network). In the case of reception, a 5G Above6 RF signal is obtained from the second cellular network 294 (e.g., a 5G network) via an antenna (e.g., the antenna 248), and may be preprocessed by a third RFFE 236. The third RFIC 226 may convert the preprocessed 5G Above6 RF signal to a baseband signal so that the base band signal is processed by the second communication processor 214. According to an embodiment, the third RFFE 236 may be implemented as a part of the third RFIC 226.

According to an embodiment, the electronic device 101 may include the fourth RFIC 228, separately from or as a part of the third RFIC 226. In this instance, the fourth RFIC 228 may convert a baseband signal generated by the second communication processor 214 into an RF signal (hereinafter, an IF signal) in an intermediate frequency band (e.g., approximately 9 GHz to 11 GHz), and may transfer the IF signal to the third RFIC 226. The third RFIC 226 may convert the IF signal to a 5G Above6 RF signal. In the case of reception, a 5G Above6 RF signal is received from the second cellular network 294 (e.g., a 5G network) via an antenna (e.g., the antenna 248), and may be converted into an IF signal by the third RFFE 236. The fourth RFIC 228 may convert the IF signal to a baseband signal so that the base band signal is processed by the second communication processor 214.

According to an embodiment, the first RFIC 222 and the second RFIC 224 may be implemented as a single chip or at least a part of the single package. According to an embodiment, the first RFFE 232 and the second RFFE 234 may be implemented as a single chip or at least a part of the single package. According to an embodiment, at least one antenna module of the first antenna module 242 or the second antenna module 244 may be omitted, or may be combined with another antenna module so as to process RF signals in a plurality of bands.

According to an embodiment, the third RFIC 226 and the antenna 248 may be disposed in the same substrate, and may form a third antenna module 246. For example, the wireless communication module 192 or the processor 120 may be disposed in a first substrate (e.g., main PCB). In this instance, the third RFIC 226 is disposed in a part (e.g., a lower part) of the second substrate (e.g., a sub PCB) separate from the first substrate and the antenna 248 is disposed on another part (e.g., an upper part), so that the third antenna module 246 is formed. By disposing the third RFIC 226 and the antenna 248 in the same substrate, the length of a transmission line therebetween may be reduced. For example, this may reduce a loss (e.g., attenuation) of a signal in a high-frequency band (e.g., approximate 6 GHz to 60 GHz) used for 5G network communication, the loss being caused by a transmission line. Accordingly, the electronic device 101 may improve the quality or speed of communication with the second cellular network 294 (e.g., 5G network).

According to an embodiment, the antenna 248 may be implemented as an antenna array including a plurality of antenna elements which may be used for beamforming. In this instance, the third RFIC 226 may be, for example, a part of the third RFFE 236, and may include a plurality of phase shifters 238 corresponding to a plurality of antenna elements. In the case of transmission, each of the plurality of phase shifters 238 may shift the phase of a 5G Above6RF signal to be transmitted to the outside of the electronic device 101 (e.g., a base station of a 5G network) via a corresponding antenna element. In the case of reception, each of the plurality of phase shifters 238 may shift the phase of the 5G Above6 RF signal received from the outside via a corresponding antenna element into the same or substantially the same phase. This may enable transmission or reception via beamforming between the electronic device 101 and the outside.

The second cellular network 294 (e.g., 5G network) may operate independently (e.g., Stand-Along (SA)) from the first cellular network 292 (e.g., a legacy network), or may operate by being connected thereto (e.g., Non-Stand Alone (NSA)). For example, in the 5G network, only an access network (e.g., 5G radio access network (RAN) or next generation RAN (NG RAN)) may exist, and a core network (e.g., next generation core (NGC)) may not exist. In this instance, the electronic device 101 may access an access network of the 5G network, and may access an external network (e.g., the Internet) under the control of the core network (e.g., an evolved packet core (EPC)) of the legacy network. Protocol information (e.g., LTE protocol information) for communication with the legacy network or protocol information (e.g., new radio (NR) protocol information) for communication with the 5G network may be stored in the memory 230, and may be accessed by another component (e.g., the processor 120, the first communication processor 212, or the second communication processor 214).

FIG. 3 illustrates a protocol stack structure of a network environment of legacy communication and/or 5G communication according to an embodiment of the disclosure.

Referring to FIG. 3, a network environment 100 according to an illustrated embodiment may include an electronic device 101, a legacy network 392, a 5G network 394, and a server 108.

The electronic device 101 may include an Internet protocol 312, a first communication protocol stack 314, and a second communication protocol stack 316. The electronic device 101 may communicate with the server 108 through the legacy network 392 and/or the 5G network 394.

According to an embodiment, the electronic device 101 may perform Interne communication associated with the server 108 through the Internet protocol 312 (for example, a transmission control protocol (TCP), a user datagram protocol (UDP), or an internet protocol (IP)). The Internet protocol 312 may be executed by, for example, a main processor (for example, the main processor 121 of FIG. 1) included in the electronic device 101.

According to another embodiment, the electronic device 101 may perform wireless communication with the legacy network 392 through the first communication protocol stack 314. According to another embodiment, the electronic device 101 may perform wireless communication with the 5G network 394 through the second communication protocol stack 316. The first communication protocol stack 314 and the second communication protocol stack 316 may be executed by, for example, one or more communication processors (for example, the wireless communication module 192 of FIG. 1) included in the electronic device 101.

The server 108 may include an Internet protocol 322. The server 108 may transmit and receive data related to the Internet protocol 322 to and from the electronic device 101 through the legacy network 392 and/or the 5G network 394. According to an embodiment, the server 108 may include a cloud computing server existing outside the legacy network 392 or the 5G network 394. According to another embodiment, the server 108 may include an edge computing server (or a mobile edge computing (MEC) server) located inside at least one of the legacy network or the 5G network 394.

The legacy network 392 may include an LTE eNode B (eNB) 340 and an evolved packet core (EPC) 342. The LTE eNB 340 may include an LTE communication protocol stack 344. The EPC 342 may include a legacy non-access stratum (NAS) protocol 346. The legacy network 392 may perform LTE wireless communication with the electronic device 101 through the LTE communication protocol stack 344 and the legacy NAS protocol 346.

The 5G network 394 may include an NR next-generation node B (gNB) 350 and a 5G core (5GC) 352. The NR gNB 350 may include an NR communication protocol stack 354. The 5GC 352 may include a 5G NAS protocol 356. The 5G network 394 may perform NR wireless communication with the electronic device 101 through the NR communication protocol stack 354 and the 5G NAS protocol 356.

According to an embodiment, the first communication protocol stack 314, the second communication protocol stack 316, the LTE communication protocol stack 344, and the NR communication protocol stack 354 may include a control plane protocol for transmitting and receiving a control message and a user plane protocol for transmitting and receiving user data. The control message may include a message related to at least one of, for example, security control, bearer setup, authentication, registration, or mobility management. The user data may include, for example, the remaining data except other than the control message.

According to an embodiment, the control plane protocol and the user plane protocol may include a physical (PHY) layer, a medium access control (MAC) layer, a radio link control (RLC) layer, or a packet data convergence protocol (PDCP) layer. The PHY layer may channel-code and modulate data received from, for example, a higher layer (for example, the MAC layer), transmit the data through a radio channel, demodulate and decode the data received through the radio channel, and transmit the data to the higher layer. The PHY layer included in the second communication protocol stack 316 and the NR communication protocol stack 354 may further perform an operation related to beamforming. The MAC layer may logically/physically map, for example, data to a radio channel for transmitting and receiving the data and perform a hybrid automatic repeat request (HARQ) for error correction. The RLC layer may perform, for example, data concatenation, segmentation, or reassembly, and data sequence identification, reordering, or duplication detection. The PDCP layer may perform an operation related to, for example, ciphering of a control message and user data and data integrity. The second communication protocol stack 316 and the NR communication protocol stack 354 may further include a service data adaptation protocol (SDAP). The SDAP may manage allocation of radio bearers on the basis of quality of service (QoS) of user data.

According to certain embodiments, the control plane protocol may include a radio resource control (RRC) layer and a non-access stratum (NAS) layer. The RRC layer may process control, for example, data related to radio bearer setup, paging, or mobility management. The NAS may process, for example, a control message related to authentication, registration, or mobility management.

Figure 4A:
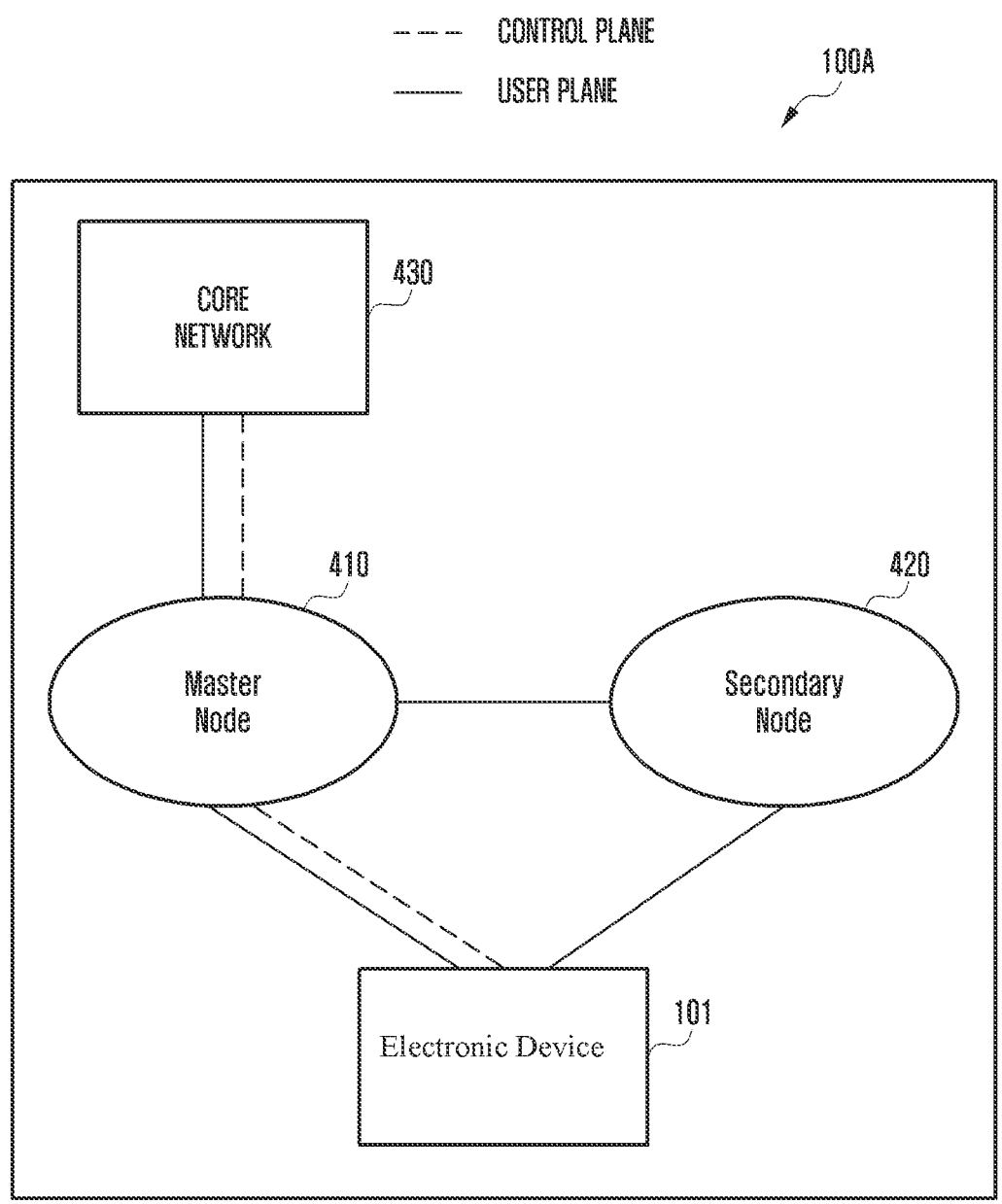
FIGS. 4A, 4B, and 4C are diagrams illustrating wireless communication systems providing a network of legacy communication and/or 5G communication according to various embodiments of the disclosure.
Figure 4B:
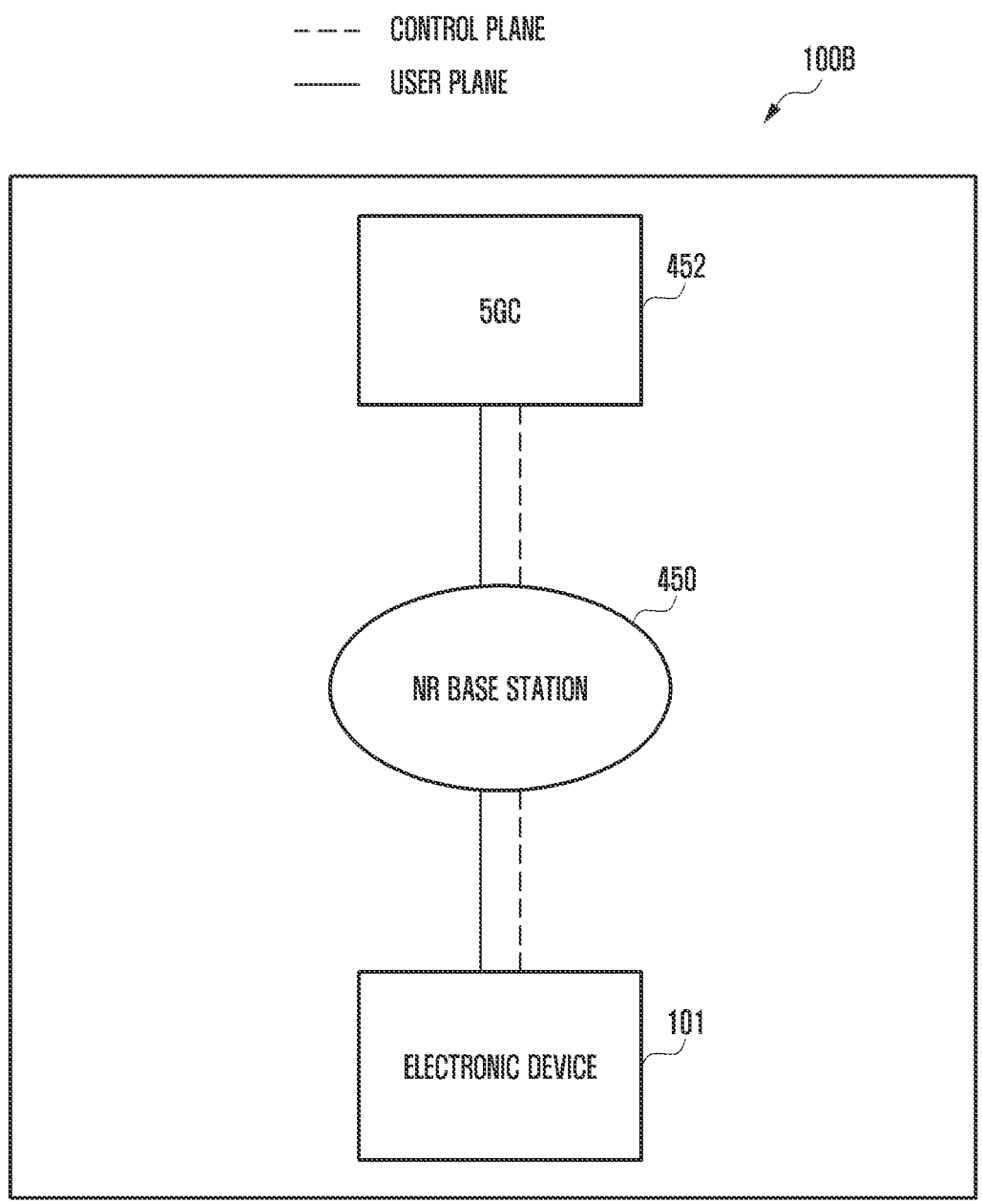
Figure 4C:
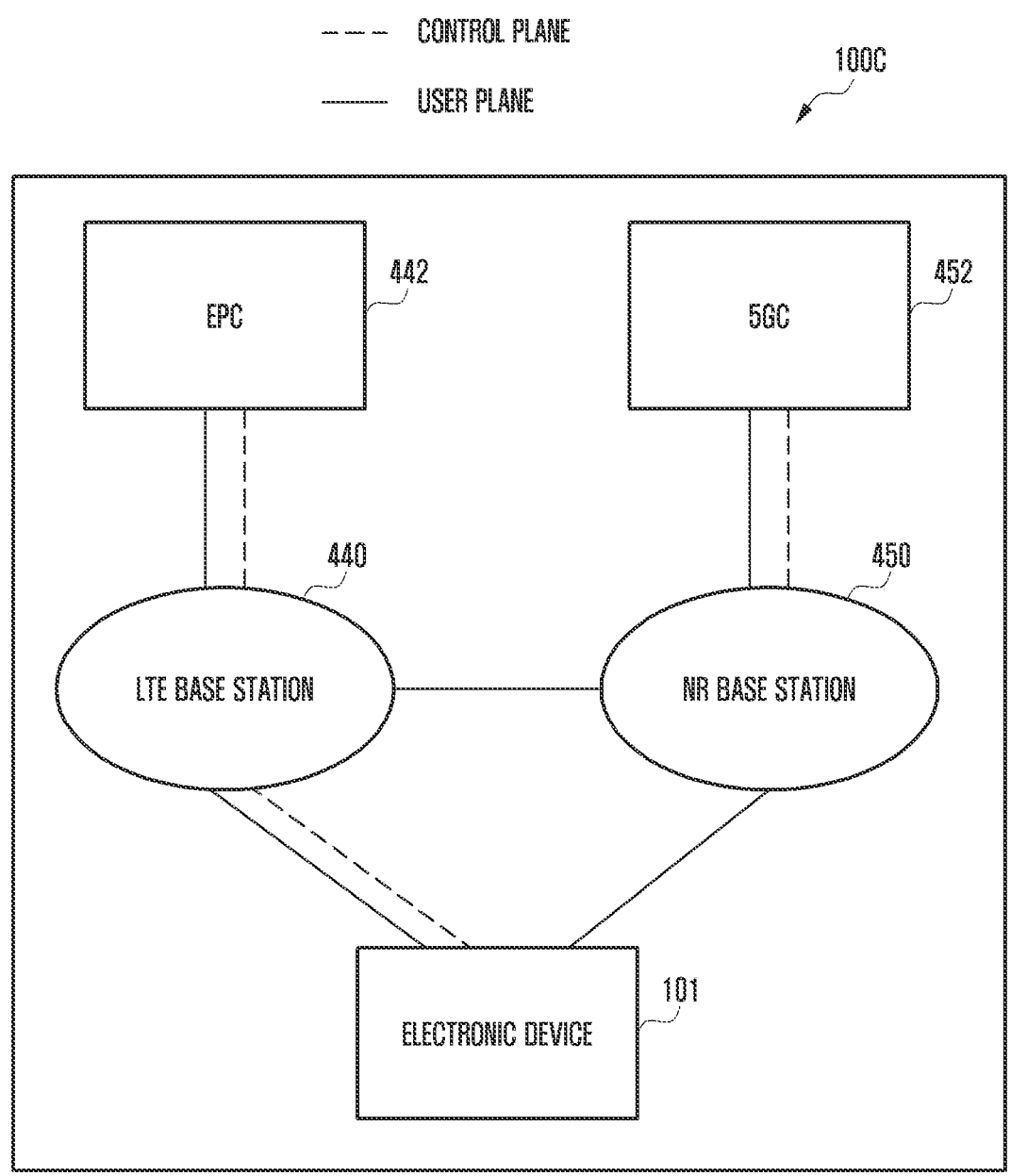

FIG. 4A illustrates a wireless communication system providing a network of legacy communication and/or 5G communication according to an embodiment of the disclosure. FIG. 4B illustrates a wireless communication system providing a network of legacy communication and/or 5G communication according to an embodiment of the disclosure. FIG. 4C illustrates a wireless communication system providing a network of legacy communication and/or 5G communication according to an embodiment of the disclosure.

Referring to FIGS. 4A to 4C, network environments 100A, 100B, and 100C may include at least one of a legacy network and a 5G network. The legacy network may include, for example, a 4G or LTE eNB 440 (for example, an eNodeB (eNB)) of the 3GPP standard supporting radio access with the electronic device 101 and an evolved packet core (EPC) 451 for managing 4G communication. The 5G network may include, for example, a new radio (NR) gNB 450 (for example, a gNodeB (gNB)) supporting radio access with the electronic device 101 and a 5th generation core (5GC) 452 for managing 5G communication of th electronic device 101.

According to certain embodiments, the electronic device 101 may transmit and receive a control message and user data through legacy communication and/or 5G communication. The control message may include, for example, a control message related to at least one of security control of the electronic device 101, bearer setup, authentication, registration, or mobility management. The user data may be, for example, user data other than a control message transmitted and received between the electronic device 101 and a core network 430 (for example, the EPC 442).

Referring to FIG. 4A, the electronic device 101 according to an embodiment may transmit and receive at least one of a control message or user data to and from at least some of the 5G network (for example, the NR gNB 450 and the 5GC 452) using at least some of the legacy network (for example, the LTE eNB 440 and the EPC 442).

According to certain embodiments, the network environment 100A may include a network environment for providing wireless communication dual connectivity (multi-radio access technology (RAT) dual connectivity (MR-DC)) to the LTE eNB 440 and the NR gNB 450 and transmitting and receiving a control message to and from the electronic device 101 through one core network 430 of the EPC 442 or the 5GC 452.

According to certain embodiments, one of the MR-DC environment, the LTE eNB 440 or the NR gNB 450 may operate as a master node (MN) 410, and the other may operate as a secondary node (SN) 420. The MN 410 may be connected to the core network 430 and transmit and receive a control message. The MN 410 and the SN 420 may be connected to each other through a network interface and transmit and receive a message related to radio resource (for example, communication channel) management.

According to certain embodiments, the MN 410 may include the LTE eNB 440, the SN 420 may include the NR gNB 450, and the core network 430 may include the EPC 442. For example, a control message may be transmitted and received through the LTE eNB 440 and the EPC 442, and user data may be transmitted and received through the LTE eNB 440 and the NR gNB 450.

Referring to FIG. 4B, according to certain embodiments, the 5G network may independently transmit and receive a control message and user data to and from the electronic device 101.

Referring to FIG. 4C, the legacy network and the 5G network according to certain embodiments may independently provide data transmission and reception. For example, the electronic device 101 and the EPC 442 may transmit and receive a control message and user data through the LTE eNB 440. According to another embodiment, the electronic device 101 and the 5GC 452 may transmit and receive a control message and user data through the NR gNB 450.

According to certain embodiments, the electronic device 101 may be registered in at least one of the EPC 442 or the 5GC 452 and transmit and receive a control message.

According to certain embodiments, the EPC 442 or the 5GC 452 may interwork and manage communication of the electronic device 101. For example, movement information of the electronic device 101 may be transmitted and received through an interface between the EPC 442 and the 5GC 452.

Figure 5A:
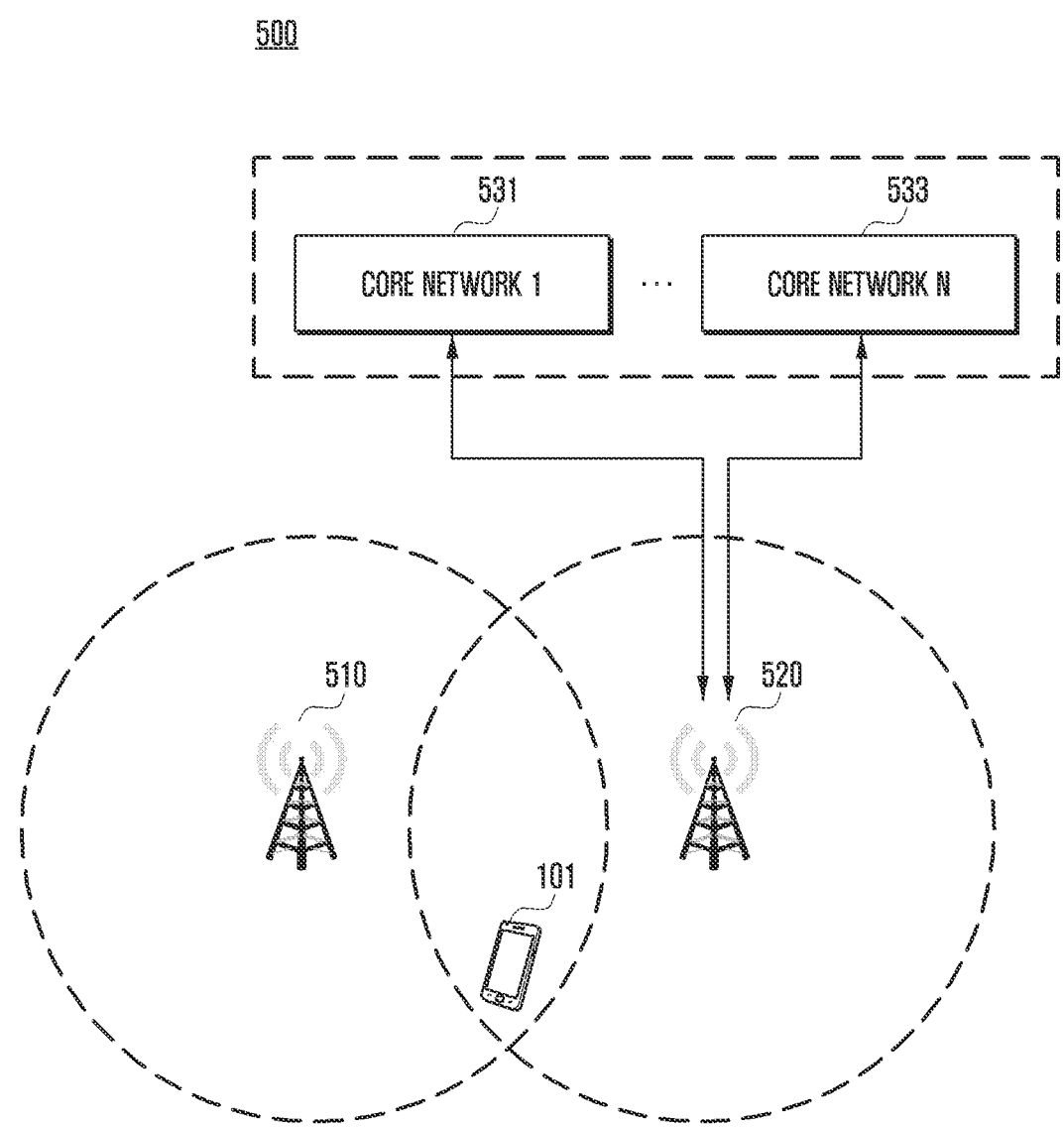
FIG. 5A is a diagram illustrating an electronic device and a cellular network according to an embodiment of the disclosure.

FIG. 5A is a diagram illustrating an electronic device and a cellular network according to an embodiment of the disclosure.

Referring to FIG. 5A, a cellular network 500 may include a first node 510 (e.g., the NR base station 450 in FIG. 4B or the LTE base station 440 in FIG. 4C) and/or a second node 520 (e.g., the NR base station 450 in FIG. 4B or the LTE base station 440 in FIG. 4C).

The first node 510 may be a base station supporting a first cellular communication or a second cellular communication. The first cellular communication is one communication method among various cellular communication methods supportable by an electronic device (e.g., the electronic device 101 in FIG. 1) and, for example, may indicate a communication method in the second cellular network 294 in FIG. 2. For example, the first cellular communication may be a communication method using a 5th generation mobile communication method (e.g., new radio (NR)). The first node may be a base station supporting the second cellular communication. The second cellular communication is one communication method among various cellular communication methods supportable by the electronic device 101 and, for example, may indicate a communication method in the first cellular network 292 in FIG. 2. For example, the second cellular communication may be a communication method using a 4th generation mobile communication method (e.g., long-term evolution (LTE)).

The first node 510 may transmit or receive a signal in a frequency band supported by the first cellular communication or the second cellular communication. When the electronic device 101 is connected to the cellular network 500 through the first node 510, the electronic device 101 may perform data communication by using a signal in a frequency band supported by the first node 510.

The second node 520 may be a base station supporting a first cellular communication or a second cellular communication. The first cellular communication is one communication method among various cellular communication methods supportable by an electronic device (e.g., the electronic device 101 in FIG. 1) and, for example, may indicate a communication method in the second cellular network 294 in FIG. 2. For example, the first cellular communication may be a communication method using a 5th generation mobile communication method (e.g., new radio (NR)). The second node may be a base station supporting the second cellular communication. The second cellular communication is one communication method among various cellular communication methods supportable by the electronic device 101 and, for example, may indicate a communication method in the first cellular network 292 in FIG. 2. For example, the second cellular communication may be a communication method using a 4th generation mobile communication method (e.g., long-term evolution (LTE)).

The second node 520 may transmit or receive a signal in a frequency band supported by the first cellular communication or the second cellular communication. When the electronic device 101 is connected to the cellular network 500 through the second node 520, the electronic device 101 may perform data communication by using a signal in a frequency band supported by the second node 520.

The electronic device 101 may be connected to the first node 510 and perform data transmission and/or reception through the first cellular communication. The electronic device 101 may perform data transmission and/or reception through the first cellular communication, and then may be switched to an idle state of the first cellular communication or maintain a connected state.

The electronic device 101 may receive a measurement configuration from the cellular network 500 in a state (e.g., RRC connected state) of being connected to the first node 510. The measurement configuration may be included in an RRC reconfiguration message. The measurement configuration may include a measurement object including identification information of a neighboring node and a frequency band to be measured by the electronic device 101, a report configuration including a condition for reporting, by the electronic device 101, the quality of a signal measured based on the measurement object, and/or measurement identification information (measurement Id) including identification information of a result of measuring the quality of the signal and the measurement object.

The electronic device 101 may receive a signal broadcast by a neighboring node (e.g., the second node 520) through the frequency band included in the measurement object, and measure the quality of the signal. The electronic device 101 may identify that the quality of the signal broadcast by the second node 520 satisfies a condition, included in the report configuration, for reporting the quality of a signal, and transmit a measurement report including the quality of the signal broadcast by the second node 520, to the first node 510 or the cellular network 500.

The first node 510 or the cellular network 500 having received the measurement report may transmit a command of handover to the second node 520, which is a neighboring node, to the electronic device 101 according to the quality of the signal broadcast by the node included in the measurement report. The electronic device 101 may perform a series of operations (e.g., initial access) for connecting to the second node 520, based on reception of the command of handover.

The second node 520 is a node shared by multiple cellular operators, and may be a node included in a shared network. When the second node 520 is a node commonly used by multiple cellular network operators, the second node 520 may be a node which is able to access core networks 531 and 533 (e.g., the core network 430 in FIG. 4A) operated by the multiple cellular network operators, respectively.

The second node 520 may broadcast system information (e.g., system information block (SIB) 1) including pieces of identification information (e.g., public land mobile networks (PLMNs)) of the multiple cellular network operators. The electronic device 101 may receive the system information including the pieces of identification information of the multiple cellular network operators, and select one piece of identification information among the pieces of identification information of the multiple cellular network operators. The electronic device 101 may transmit a signal (e.g., RRC connection setup complete message) including the selected piece of identification information to the second node 520. The second node 520 may receive the signal including the selected piece of identification information, and may allow the electronic device 101 to be connected to a core network operated by a cellular network operator corresponding to the selected piece of identification information included in the signal.

However, due to various causes (e.g., errors), the second node 520 may attempt to connect the electronic device 101 to a core network (e.g., core network N 533) operated by another cellular network operator other than the core network (e.g., core network 1 531) operated by the cellular network operator corresponding to the selected piece of identification information. Core network N 533 that is a core network operated by the other cellular network operator may identify that the electronic device 101 has no authority to access a cellular network operated by the other cellular network operator, reject (or block) access of the electronic device 101, and transmit a message indicating to reject (or block) access of the electronic device 101 to the electronic device 101.

The electronic device 101 may, in response to reception of the message indicating to reject access of the electronic device 101, add identification information (e.g., PLMN) of the cellular network operator having transmitted the message to a forbidden public land mobile network (FPLMN) list including a node (e.g., the second node 520) forbidding access attempt of the electronic device 101. The electronic device 101 may not perform access (or handover) to a cellular network operator included in the FPLMN list or a node operated by the cellular network operator.

Figure 5B:
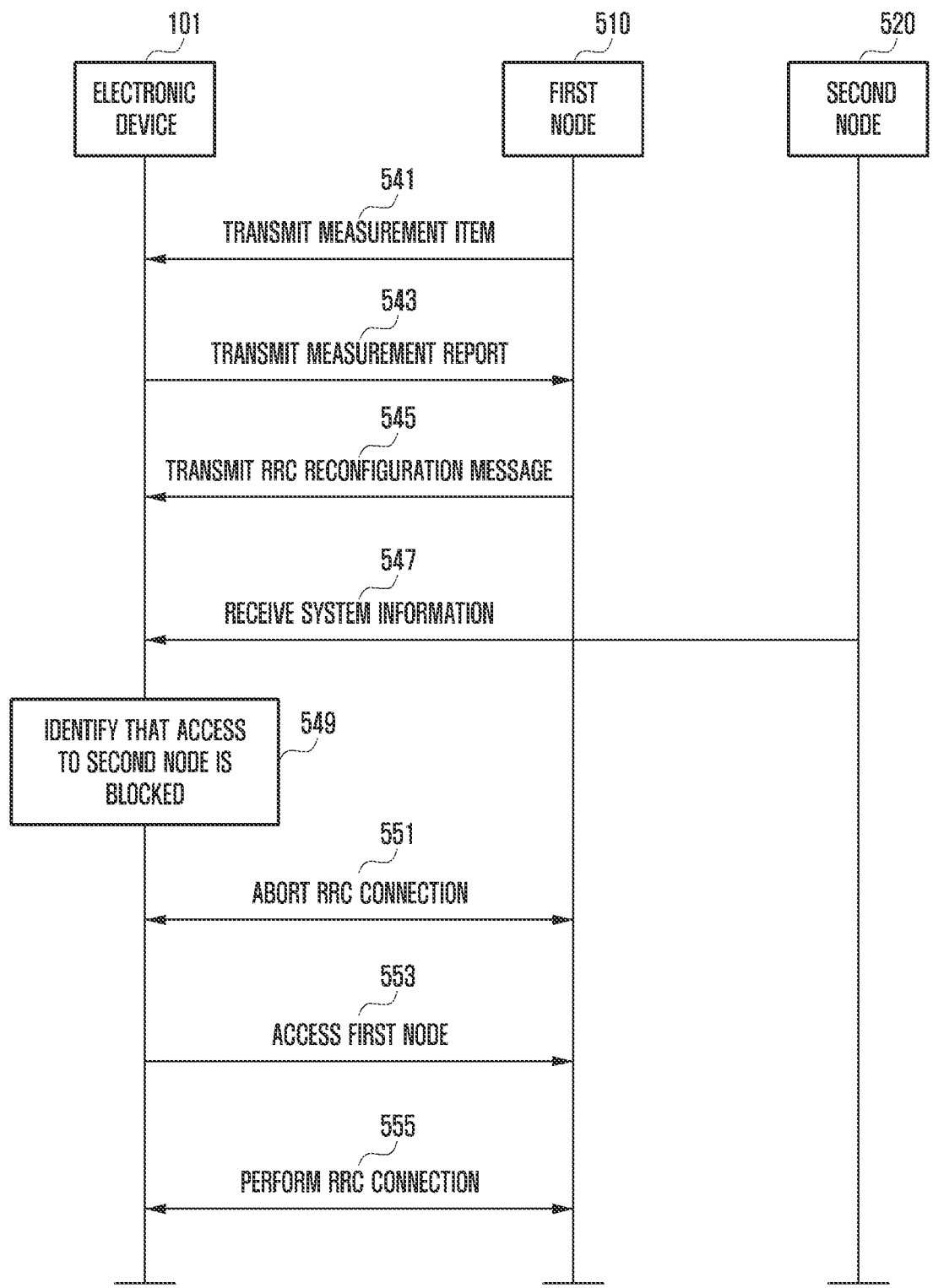
FIG. 5B is a diagram illustrating an embodiment in which an electronic device receives a command of handover to a second node included in an FPLMN list according to an embodiment of the disclosure.

FIG. 5B is a diagram illustrating an embodiment in which an electronic device receives a command of handover to a second node included in an FPLMN list according to an embodiment of the disclosure.

Referring to FIG. 5B, a first node (e.g., the first node 510 in FIG. 5A) may transmit a measurement item to an electronic device (e.g., the electronic device 101 in FIG. 5A), in operation 541.

The electronic device 101 may be connected to the first node 510 and perform data transmission and/or reception through a first cellular communication. The electronic device 101 may perform data transmission and/or reception through the first cellular communication, and then may be switched to an idle state of the first cellular communication or maintain a connected state.

The electronic device 101 may receive a measurement configuration from the cellular network 500 in a state (e.g., RRC connected state) of being connected to the first node 510. The measurement configuration may be included in an RRC reconfiguration message. The measurement configuration may include a measurement object including identification information of a neighboring node and a frequency band to be measured by the electronic device 101, a report configuration including a condition for reporting, by the electronic device 101, the quality of a signal measured based on the measurement object, and/or measurement identification information (measurement Id) including identification information of a result of measuring the quality of the signal and the measurement object.

The electronic device 101 may transmit a measurement report to the first node 510, in operation 543.

The electronic device 101 may receive a signal broadcast by a neighboring node (e.g., the second node 520) through the frequency band included in the measurement object, and measure the quality of the signal. The electronic device 101 may identify that the quality of the signal broadcast by the second node 520 satisfies a condition, included in the report configuration, for reporting the quality of a signal, and transmit a measurement report including the quality of the signal broadcast by the second node 520, to the first node 510 or the cellular network 500.

The first node 510 may transmit an RRC reconfiguration message to the electronic device 101, in operation 545.

The first node 510 or the cellular network 500 having received the measurement report may transmit a command of handover to the second node 520, which is a neighboring node, to the electronic device 101 according to the quality of the signal broadcast by the node included in the measurement report. The electronic device 101 may perform a series of operations (e.g., initial access) for connecting to the second node 520, based on reception of the command of handover. The RRC reconfiguration message may include a handover command indicating to perform handover to the second node 520.

The electronic device 101 may receive system information transmitted or broadcast by the second node (e.g., the second node 520 in FIG. 5A), in operation 547.

The electronic device 101 may receive the RRC reconfiguration message including the handover command, and then receive system information transmitted or broadcast by the second node 520, based on information of the second node 520 included in the handover command.

The second node 520 is a node shared by multiple cellular operators, and may be a node included in a shared network. When the second node 520 is a node commonly used by multiple cellular network operators, the second node 520 may be a node which is able to access core networks 531 and 533 (e.g., the core network 430 in FIG. 4A) operated by the multiple cellular network operators, respectively.

The second node 520 may broadcast system information (e.g., system information block (SIB) 1) including pieces of identification information (e.g., public land mobile networks (PLMNs)) of the multiple cellular network operators.

The electronic device 101 may identify that access to the second node 520 is blocked, in operation 549.

The electronic device 101 may identify the pieces of identification information of the multiple cellular network operators included in the system information, and identify whether at least some of the pieces of identification information of the multiple cellular network operators are included in a forbidden public land mobile network (FPLMN) list. The FPLMN list may be a list including a node to which the electronic device 101 forbids an attempt of access.

The electronic device 101 may identify that access to the second node 520 is blocked, when the information of the second node 520 is included in the FPLMN list.

The electronic device 101 may abort RRC connection with the first node 510, in operation 551.

The electronic device 101 may, in operation 553, access the first node 510 in a state (RRC release state) in which RRC connection is released.

The electronic device 101 may attempt again to access the first node 510, which has been previously connected thereto, in a situation where access to the second node 520 is blocked, thereby attempting to maintain connection of cellular communication.

The electronic device 101 and the first node 510 may perform RRC connection, in operation 555.

However, a situation where the second node 520 is included in the FPLMN list may occur regardless of the intent of the cellular network. According to an embodiment, the second node 520 may block access of the electronic device 101 due to temporarily error of the second node 520 although the electronic device 101 has subscribed to one cellular network among the multiple cellular networks operating the second node 520. The electronic device 101 may add identification information (e.g., PLMNs) of multiple cellular network operators operated by the second node 520 to the FPLMN list. The electronic device 101 may be able to access the second node 520, or may be unable to access the second node 520 because the second node 520 is added to the FPLMN list. When the electronic device 101 is unable to access the second node 520, the quality of cellular communication may degrade and/or connection of cellular communication may be temporarily released.

Furthermore, when a command of handover to the second node 520 is received from the cellular network 500 in a state where identification information of the second node 520 is included in the FPLMN list, the electronic device 101 may release RRC connection and access the first node 510 again. When a command of handover to the second node 520 is received again, the electronic device 101 may repeatedly release RRC connection and access the first node 510. When release of RRC connection and access to the first node 510 are repeatedly performed, the quality of cellular communication may degrade and/or connection of cellular communication may be temporarily released.

Hereinafter, an embodiment in which the electronic device 101 may access the second node 520 included in a FPLMN list will be described.

Figure 6:
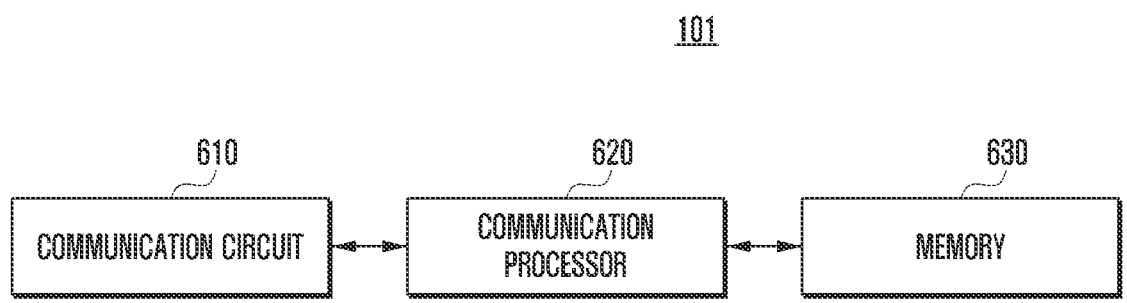
FIG. 6 is a block diagram of an electronic device according to an embodiment of the disclosure.

FIG. 6 is a block diagram of an electronic device according to an embodiment of the disclosure.

Referring to FIG. 6, an electronic device (e.g., the electronic device 101 in FIG. 1) according to various embodiments of the disclosure may include a communication circuit 610 (e.g., the wireless communication module 192 in FIG. 1), a communication processor 620 (e.g., the processor 120 in FIG. 1, or the first communication processor 212 and/or the second communication processor 214 in FIG. 2), and/or a memory 630 (e.g., the memory 130 in FIG. 1).

The communication circuit 610 is a communication circuit supporting a first cellular communication and/or a second cellular communication, and may provide communication with an external electronic device (e.g., the electronic device 104 in FIG. 1) to the electronic device 101 through the first cellular communication and/or the second cellular communication.

The communication processor 620 may be operatively connected to the communication circuit 610. The communication processor 620 may control elements of the electronic device 101. For example, the communication processor 620 may control elements of the electronic device 101 according to one or more instructions stored in the memory 630 (e.g., the memory 130 in FIG. 1).

The memory 630 may be an element that stores various information. According to an embodiment, the memory 630 may store a forbidden public land mobile network (FPLMN) including identification information (e.g., PLMN) of a cellular network to which access of the electronic device 101 is blocked, information of a node operated by the cellular network to which access of the electronic device 101 is blocked, and/or information (e.g., tracking area identity (TAI)) on an area distinguished by the cellular network.

The communication processor 620 may perform data transmission and/or reception through the first cellular communication and/or the second cellular communication. The communication processor 620 may be connected to a first node (e.g., the first node 510 in FIG. 5A) through the first cellular communication and/or the second cellular communication, or may be connected to a second node (e.g., the second node 520 in FIG. 5A) through the first cellular communication and/or the second cellular communication. The communication processor 620 may transmit user data received from an application processor (e.g., the processor 120 in FIG. 1), through the first cellular communication and/or the second cellular communication, and transmit user data received through the first cellular communication and/or the second cellular communication to the application processor (e.g., processor 120 of FIG. 1).

The first cellular communication is one communication method among various cellular communication methods supportable by the electronic device 101 and, for example, may indicate a communication method in the second cellular network 294 in FIG. 2. For example, the first cellular communication may be a communication method using a 5th generation mobile communication method (e.g., new radio).

The second cellular communication is one communication method among various cellular communication methods supportable by an electronic device (e.g., the electronic device 101 in FIG. 1) and, for example, may indicate a communication method in the first cellular network 292 in FIG. 2. For example, the second cellular communication may be a communication method using a 4th generation mobile communication method (e.g., long-term evolution).

The communication processor 620 may be connected to the first node 510 to use the first cellular communication and/or the second cellular communication. According to an embodiment, the communication processor 620 may receive an RRC reconfiguration message from the first node 510 after connection to the first node 510 is completed.

The RRC reconfiguration message may include a measurement configuration. The measurement configuration may include information for connecting the electronic device 101 to a node other than the first node 510. The measurement configuration may include a measurement object including identification information of a neighboring node and a frequency band to be measured by the electronic device 101, a report configuration including a condition for reporting, by the electronic device 101, the quality of a signal measured based on the measurement object, and/or measurement identification information (measurement Id) including identification information of a result of measuring the quality of the signal and the measurement object.

The communication processor 620 may receive a signal broadcast by a neighboring node (e.g., the second node 520) through the frequency band included in the measurement object, and measure the quality of the signal.

The communication processor 620 may identify that the quality of the signal broadcast by the second node 520 satisfies a condition, included in the report configuration, for reporting the quality of a signal, and transmit a measurement report including the quality of the signal broadcast by the second node 520, to the first node 510 or the cellular network 500.

The first node 510 or the cellular network 500 having received the measurement report may transmit a command of handover to the second node 520, which is a neighboring node, to the electronic device 101 according to the quality of the signal broadcast by the node included in the measurement report. The communication processor 620 may perform a series of operations (e.g., initial access) for connecting to the second node 520, based on reception of the command of handover. The command of handover may be included in an RRC reconfiguration message.

The communication processor 620 may receive the command of the handover, and identify information of the second node 520 to which handover is to be performed, which is included in the command of handover. The information of the second node 520 may include information of a frequency band supported by the second node 520 and/or identification information of the second node 520.

The communication processor 620 may control the communication circuit 610 to receive a signal in the frequency band supported by the second node 520, and receive a signal transmitted or broadcast by the second node 520.

According to an embodiment, the second node 520 is a node shared by multiple cellular operators, and may be a node included in a shared network. When the second node 520 is a node commonly used by multiple cellular network operators, the second node 520 may be a node which is able to access core networks 531 and 533 (e.g., the core network 430 in FIG. 4A) operated by the multiple cellular network operators, respectively. The second node 520 may broadcast system information (e.g., system information block (SIB) 1) including identification information (e.g., public land mobile networks (PLMNs)) of the multiple cellular network operators.

A signal transmitted or broadcast by the second node 520 may be system information of the second node 520. The system information broadcast by the second node 520 may include various information. The system information may include SIB 1 defined in 3GPP TS. 36.331 v15.6. SIB 1 may include information on the second node 520. For example, SIB 1 is information required for connection with the second node 520, and may include physical identification information (physical cell identification (PCI)) of the second node 520 and a frequency band used by the second node 520.

The communication processor 620 may identify whether information of the second node 520 included in the system information is included in the FPLMN list, before performing handover to the second node 520.

The communication processor 620 may, based on identification that the system information broadcast by the second node 520 includes identification information of multiple cellular network operators, identify whether information of the second node 520 included in the system information is included in the FPLMN list.

The communication processor 620 may identify that the information of the second node 520 is included in the FPLMN list. The communication processor 620 may transmit a signal requesting a particular service to the second node 520, based on identification that the information of the second node 520 is included in the FPLMN list.

The particular service may include a service performable through the second node 520. According to an embodiment, the particular service may include tracking area update (TAU) by which the location of the electronic device 101 registered in the cellular network 500 is updatable. When the particular service is TAU, the signal requesting the particular service may be a tracking area update (TAU) request signal. According to an embodiment, the particular service may include location registration that is a service by which the electronic device 101 is registered in the cellular network 500 according to the movement of the electronic device 101. When the particular service is location registration, the signal requesting the particular service may be a location registration request signal.

The communication processor 620 may not abort handover to the second node 520, transmit a signal requesting a particular service to the second node 520, and then according to whether a response message corresponding to the signal is received, determine whether to abort handover to the second node 520.

The communication processor 620 may perform handover to the second node 520 when an accept message corresponding to the signal requesting the particular service is received.

A situation where the electronic device 101 has received an accept message corresponding to the signal requesting the particular service from the second node 520 may indicate a situation where the electronic device 101 is able to access the second node 520 and/or perform cellular communication through the second node 520. That is, a situation where identification information of the second node 520 is included in the FPLMN list may indicate a situation where the inclusion has occurred due to temporarily error of the second node 520. Therefore, the electronic device 101 may perform handover to the second node 520 according to reception of an accept message corresponding to the signal requesting the particular service from the second node 520, and according to completion of the handover to the second node 520, control the communication circuit 610 to perform cellular communication through the second node 520.

The communication processor 620 may determine to perform handover to the second node 520, and remove the identification information of the second node 520 from the FPLMN list. When the identification information of the second node 520 is removed from the FPLMN list, the electronic device 101 may be able to perform handover to the second node 520.

When the communication processor 620 fails to receive an accept message corresponding to the signal requesting the particular service, or when a reject message is received, the communication processor 620 may not perform handover to the second node 520.

A situation where the electronic device 101 has failed to receive an accept message corresponding to the signal requesting the particular service from the second node 520 or has received a reject message may indicate a situation where the electronic device 101 is unable to access the second node 520 and/or perform cellular communication through the second node 520. That is, a situation where identification information of the second node 520 is included in the FPLMN list may indicate a situation where the electronic device 101 is actually forbidden to access the second node 520, rather than indicating temporarily error of the second node 520. Therefore, when the electronic device 101 fails to receive an accept message corresponding to the signal requesting the particular service from the second node 520, or when a reject message is received, the electronic device 101 may not perform handover to the second node 520.

When the communication processor 620 fails to receive an accept message corresponding to the signal requesting the particular service, or when a reject message is received, the communication processor 620 may switch from an RRC connected state to an RRC idle state. While switching from the RRC connected state to the RRC idle state, the communication processor 620 may not transmit, to the first node 510 for a designated time interval, a result of measuring the quality of a signal broadcast by the second node 520. According to an embodiment, the communication processor 620 may switch from the RRC idle state to the RRC connected state, and then receive a measurement configuration including the information of the second node 520 from the first node 510. Even when the communication processor 620 measures the quality of a signal broadcast by the second node 520, based on the information of the second node 520, the communication processor 620 does not transmit, to the first node 510 for a designated time interval, a result of measuring the quality of the signal broadcast by the second node 520. Therefore, repetition of transmission of a signal requesting a particular service to the second node 520 and reception of a reject message may be prevented.

While switching from the RRC connected state to the RRC idle state, in order not to transmit, to the first node 510 for a designated time interval, a result of measuring the quality of a signal broadcast by the second node 520, the communication processor 620 may add the information of the second node 520 to a list of a node for which the result of quality measurement is not reported for a first time interval. In a case where the information of the second node 520 is added in a list of a node for which the result of quality measurement is not reported for the first time interval, even when the communication processor 620 measures the quality of a signal broadcast by the second node 520, based on the information of the second node 520, the communication processor 620 does not transmit, to the first node 510 for the first time interval, a result of measuring the quality of the signal broadcast by the second node 520. Therefore, repetition of transmission of a signal requesting a particular service to the second node 520 and reception of a reject message may be prevented.

The time interval for which a result of measuring the quality of a signal broadcast by the second node 520 is unreportable may vary according to the number of times that reception of an accept message corresponding to a particular service request has failed, or the number of times that a reject message has been received. The communication processor 620 may increase the time interval for which a result of measuring the quality of a signal broadcast by the second node 520 is unreportable, according to increase of the number of times that reception of an accept message corresponding to a particular service request has failed, or the number of times that a reject message has been received.

According to an embodiment, the communication processor 620 may configure the first time interval (e.g., 600 sec) as the time interval for which a result of measuring the quality of a signal broadcast by the second node 520 is unreportable in a situation where a reject message has been received for the first time after transmission of a particular service request signal to the second node 520. The communication processor 620 may configure a second time interval (e.g., 12 hours) longer than the first time interval as the time interval for which a result of measuring the quality of a signal broadcast by the second node 520 is unreportable in a situation where a reject message has been received again after transmission of a particular service request signal to the second node 520.

The communication processor 620 may add the information of the second node 520 to a list of a node for which the result of quality measurement is not reported for the first time interval, then identify that a designated time interval (e.g., the first time interval) has expired, and remove the information of the second node 520 from the list of the node for which the result of quality measurement is not reported for the first time interval. According to removal of the information of the second node 520 from the list of the node for which the result of quality measurement is not reported for the first time interval, the communication processor 620 may transmit, to the first node 510, a measurement report including the quality of a signal broadcast by the second node 520, and attempt to perform handover to the second node 520 again when a command of handover to the second node 520 is received.

The communication processor 620 may receive an equivalent PLMN (eqPLMN) list from the first node 510 while connecting to the first node 510 or performing tracking area update (TAU) with the first node 510. The eqPLMN list may indicate a list of a PLMN that is different from a PLMN (or the PLMN of a cellular network including the first node 510) to which the electronic device 101 is currently connected (or registered in), but may be treated as equivalent to the currently connected (or registered) PLMN. That is, identification information of a cellular network included in the eqPLMN list may indicate identification information of a cellular network to which the electronic device 101 is able to access. Therefore, the communication processor 620 may remove identification information included in the equivalent PLMN (eqPLMN) list received from the first node 510, from the FPLMN list. The communication processor 620 may remove identification information included in the equivalent PLMN (eqPLMN) list received from the first node 510, from the FPLMN list, thereby resolving a cellular network included in the eqPLMN list being inaccessible. he communication processor 620 may perform an operation of removing identification information included in the equivalent PLMN (eqPLMN) list received from the first node 510, from the FPLMN list, at various time points (e.g., a time point at which the electronic device 101 is rebooted).

The communication processor 620 may receive a signal broadcast by a third node, which is different from the second node 520, through the frequency band included in the measurement configuration received from the first node 510, and measure the quality of the signal.

The communication processor 620 may identify that the quality of the signal broadcast by the third node satisfies a condition, included in the report configuration, for reporting the quality of a signal, and transmit a measurement report including the quality of the signal broadcast by the third node, to the first node 510 or the cellular network 500.

The first node 510 or the cellular network 500 having received the measurement report may transmit a command of handover to the third node, which is a neighboring node, to the electronic device 101 according to the quality of the signal broadcast by the node included in the measurement report. The communication processor 620 may perform a series of operations (e.g., initial access) for connecting to the third node, based on reception of the command of handover. The command of handover may be included in an RRC reconfiguration message.

The communication processor 620 may receive the command of the handover, and identify information of the third node (not illustrated) to which handover is to be performed, which is included in the command of handover. The information of the third node may include information of a frequency band supported by the third node and/or identification information of the third node.

The communication processor 620 may control the communication circuit 610 to receive a signal in the frequency band supported by the third node, and receive a signal transmitted or broadcast by the third node.

According to an embodiment, the third node is a node shared by multiple cellular operators, and may be a node included in a shared network. When the third node is a node commonly used by multiple cellular network operators, the third node may be a node which is able to access core networks 531 and 533, the core network 430 in FIG. 4A) operated by the multiple cellular network operators, respectively. The third node may broadcast system information (e.g., system information block (SIB) 1) including identification information (e.g., public land mobile networks (PLMNs)) of the multiple cellular network operators.

The signal transmitted or broadcast by the third node may be system information of the third node. The system information broadcast by the third node may include various information. The system information may include SIB 1 defined in 3GPP TS. 36.331 v15.6. SIB 1 may include information on the third node. For example, SIB 1 is information required for connection with the third node, and may include physical identification information (physical cell identification (PCI)) of the third node and a frequency band used by the third node.

The communication processor 620 may identify whether information of the third node included in the system information is included in the FPLMN list, before performing handover to the third node.

The communication processor 620 may identify that the information of the third node is not included in the FPLMN list. The communication processor 620 may perform handover to the third node, based on identification that the information of the third node is not included in the FPLMN list.

The communication processor 620 may transmit a signal requesting a particular service to the third node according to completion of handover to the third node.

The particular service may include a service performable through the third node. According to an embodiment, the particular service may include tracking area update (TAU) by which the location of the electronic device 101 registered in the cellular network 500 is updatable. When the particular service is TAU, the signal requesting the particular service may be a tracking area update (TAU) request signal.

The communication processor 620 may transmit a signal requesting a particular service, and then according to reception of an accept message for the particular service from the third node, maintain connection with the third node.

The communication processor 620 may transmit a signal requesting a particular service, and then according to reception of a reject message for the particular service from the third node, release the connection with the third node and switch from an RRC connected state to an RRC idle state.

While switching from the RRC connected state to the RRC idle state, the communication processor 620 may not transmit, to the first node 510 for a designated time interval, a result of measuring the quality of a signal broadcast by the third node. According to an embodiment, the communication processor 620 may switch from the RRC idle state to the RRC connected state, and then receive a measurement configuration including the information of the third node from the first node 510. Even when the communication processor 620 measures the quality of a signal broadcast by the third node, based on the information of the third node, the communication processor 620 does not transmit, to the first node 510 for a designated time interval, a result of measuring the quality of the signal broadcast by the third node. Therefore, repetition of transmission of a signal requesting a particular service to the third node and reception of a reject message may be prevented.

While switching from the RRC connected state to the RRC idle state, in order not to transmit, to the first node 510 for a designated time interval, a result of measuring the quality of a signal broadcast by the third node, the communication processor 620 may add the information of the third node to a list of a node for which the result of quality measurement is not reported for a first time interval. In a case where the information of the third node is added in a list of a node for which the result of quality measurement is not reported for the first time interval, even when the communication processor 620 measures the quality of a signal broadcast by the third node, based on the information of the third node, the communication processor 620 does not transmit, to the first node 510 for the first time interval, a result of measuring the quality of the signal broadcast by the third node. Therefore, repetition of transmission of a signal requesting a particular service to the third node and reception of a reject message may be prevented.

The time interval for which a result of measuring the quality of a signal broadcast by the third node is unreportable may vary according to the number of times that reception of an accept message corresponding to a particular service request has failed, or the number of times that a reject message has been received. The communication processor 620 may increase the time interval for which a result of measuring the quality of a signal broadcast by the third node is unreportable, according to increase of the number of times that reception of an accept message corresponding to a particular service request has failed, or the number of times that a reject message has been received.

According to an embodiment, the communication processor 620 may configure the first time interval (e.g., 600 sec) as the time interval for which a result of measuring the quality of a signal broadcast by the third node is unreportable in a situation where a reject message has been received for the first time after transmission of a particular service request signal to the third node. The communication processor 620 may configure a second time interval (e.g., 12 hours) longer than the first time interval as the time interval for which a result of measuring the quality of a signal broadcast by the third node is unreportable in a situation where a reject message has been received again after transmission of a particular service request signal to the third node.

The communication processor 620 may transmit a measurement report including the quality of a signal broadcast by the third node to the first node 510 according to expiration of the designated time interval (e.g., the first time interval or the second time interval). The first node 510 may transmit a handover command to indicate handover to the third node to the electronic device 101 according to the quality of the signal.

The communication processor 620 may perform handover to the third node according to reception of the handover command, and transmit a signal requesting a particular service to the third node. When the third node transmits an accept message corresponding to the signal requesting the particular service, the communication processor 620 may maintain the connection with the third node. Alternatively, when the third node transmits a reject message corresponding to the signal requesting the particular service, the communication processor 620 may release the connection with the third node. The communication processor 620 may add the information of the third node to the FPLMN list in the RRC idle state.

Figure 7:
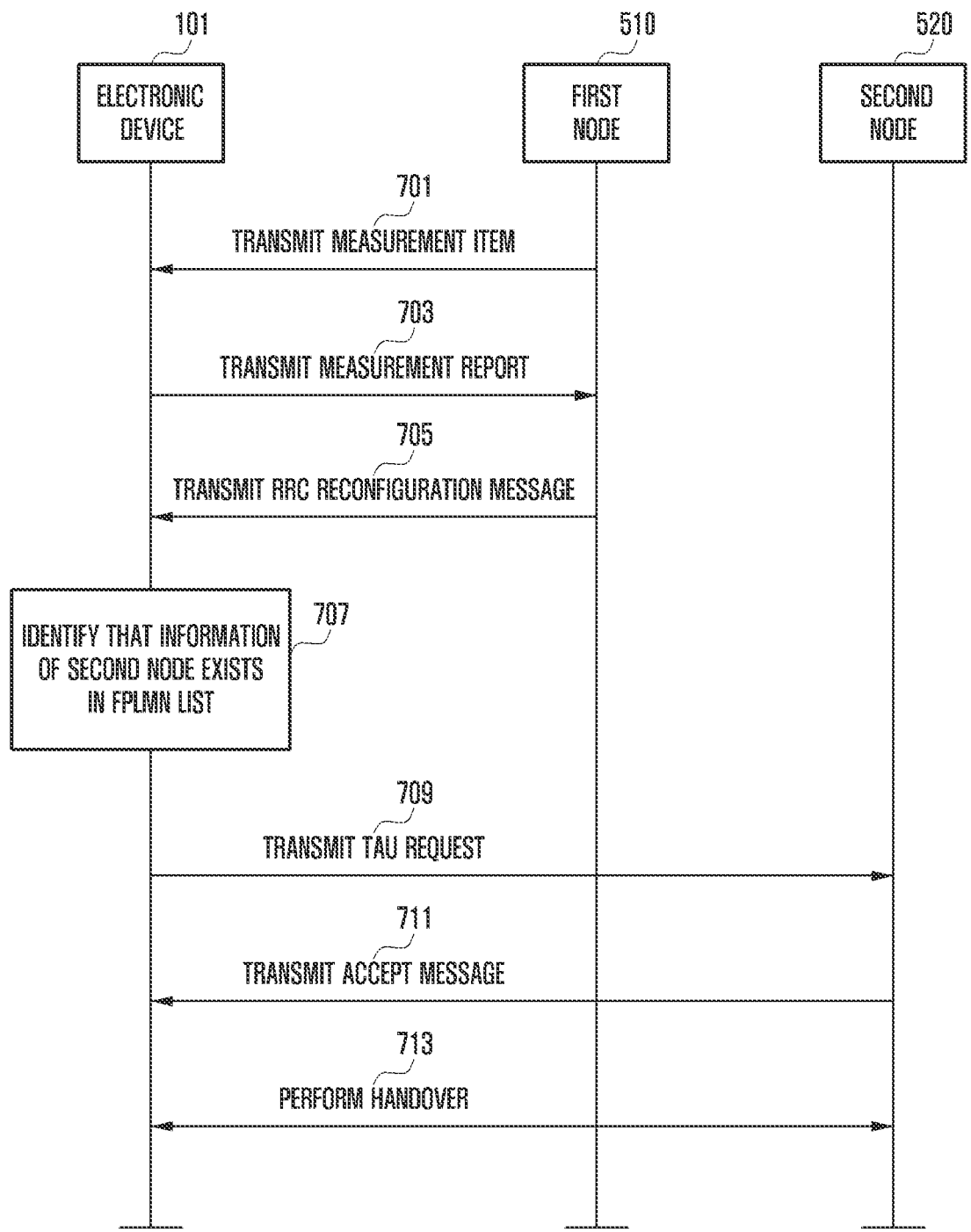
FIG. 7 is a diagram illustrating an embodiment in which an electronic device transmits a TAU request signal when a command of handover to a second node included in an FPLMN list is received according to an embodiment of the disclosure.

FIG. 7 is a diagram illustrating an embodiment in which an electronic device transmits a TAU request signal when a command of handover to a second node included in an FPLMN list is received according to an embodiment of the disclosure.

Referring to FIG. 7, a first node (e.g., the first node 510 in FIG. 5A) may transmit a measurement item to an electronic device (e.g., the electronic device 101 in FIG. 5A), in operation 701.

The electronic device 101 may be connected to the first node 510 and perform data transmission and/or reception through a first cellular communication. The electronic device 101 may perform data transmission and/or reception through the first cellular communication, and then may be switched to an idle state of the first cellular communication or maintain a connected state.

The electronic device 101 may receive a measurement configuration from the cellular network 500 in a state (e.g., RRC connected state) of being connected to the first node 510. The measurement configuration may be included in an RRC reconfiguration message. The measurement configuration may include a measurement object including identification information of a neighboring node and a frequency band to be measured by the electronic device 101, a report configuration including a condition for reporting, by the electronic device 101, the quality of a signal measured based on the measurement object, and/or measurement identification information (measurement Id) including identification information of a result of measuring the quality of the signal and the measurement object.

The electronic device 101 may transmit a measurement report to the first node 510, in operation 703.

The electronic device 101 may receive a signal broadcast by a neighboring node (e.g., the second node 520) through the frequency band included in the measurement object, and measure the quality of the signal. The electronic device 101 may identify that the quality of the signal broadcast by the second node 520 satisfies a condition, included in the report configuration, for reporting the quality of a signal, and transmit a measurement report including the quality of the signal broadcast by the second node 520, to the first node 510 or the cellular network 500.

The first node 510 may transmit an RRC reconfiguration message to the electronic device 101, in operation 705.

The first node 510 or the cellular network 500 having received the measurement report may transmit a command of handover to the second node 520, which is a neighboring node, to the electronic device 101 according to the quality of the signal broadcast by the node included in the measurement report. The electronic device 101 may perform a series of operations (e.g., initial access) for connecting to the second node 520, based on reception of the command of handover. The RRC reconfiguration message may include a handover command indicating to perform handover to the second node 520.

According to an embodiment, the second node 520 is a node shared by multiple cellular operators, and may be a node included in a shared network. When the second node 520 is a node commonly used by multiple cellular network operators, the second node 520 may be a node which is able to access core networks 531 and 533 (e.g., the core network 430 in FIG. 4A) operated by the multiple cellular network operators, respectively. The second node 520 may broadcast system information (e.g., system information block (SIB) 1) including identification information (e.g., public land mobile networks (PLMNs)) of the multiple cellular network operators.

A signal transmitted or broadcast by the second node 520 may be system information of the second node 520. The system information broadcast by the second node 520 may include various information. The system information may include SIB 1 defined in 3GPP TS. 36.331 v15.6. SIB 1 may include information on the second node 520. For example, SIB 1 is information required for connection with the second node 520, and may include physical identification information (physical cell identification (PCI)) of the second node 520 and a frequency band used by the second node 520.

The electronic device 101 may identify whether information of the second node 520 included in the system information is included in an FPLMN list, before performing handover to the second node 520.

The electronic device 101 may, based on identification that the system information broadcast by the second node 520 includes identification information of multiple cellular network operators, identify whether information of the second node 520 included in the system information is included in the FPLMN list, in operation 707.

The electronic device 101 may identify that the information of the second node 520 is included in the FPLMN list.

The electronic device 101 may transmit a tracking area update (TAU) request message to the second node 520, in operation 709.

The electronic device 101 may identify that the information of the second node 520 is included in the FPLMN list. The electronic device 101 may transmit a signal requesting a particular service to the second node 520, based on identification that the information of the second node 520 is included in the FPLMN list.

The particular service may include a service performable through the second node 520. According to an embodiment, the particular service may include tracking area update (TAU) by which the location of the electronic device 101 registered in the cellular network 500 is updatable. When the particular service is TAU, the signal requesting the particular service may be a tracking area update (TAU) request signal. According to an embodiment, the particular service may include location registration that is a service by which the electronic device 101 is registered in the cellular network 500 according to the movement of the electronic device 101. When the particular service is location registration, the signal requesting the particular service may be a location registration request signal.

The electronic device 101 may not abort handover to the second node 520, transmit a signal requesting a particular service to the second node 520, and then according to whether a response message corresponding to the signal is received, determine whether to abort handover to the second node 520.

The second node 520 may transmit an accept message corresponding to the TAU request signal to the electronic device 101, in operation 711.

The electronic device 101 may perform handover to the second node 520, in operation 713.

The electronic device 101 may perform handover to the second node 520 when an accept message corresponding to the signal requesting the particular service is received.

A situation where the electronic device 101 has received an accept message corresponding to the signal requesting the particular service from the second node 520 may indicate a situation where the electronic device 101 is able to access the second node 520 and/or perform cellular communication through the second node 520. That is, a situation where identification information of the second node 520 is included in the FPLMN list may indicate a situation where the inclusion has occurred due to temporarily error of the second node 520. Therefore, the electronic device 101 may perform handover to the second node 520 according to reception of an accept message corresponding to the signal requesting the particular service from the second node 520, and according to completion of the handover to the second node 520, control the communication circuit 610 to perform cellular communication through the second node 520.

Figure 8:
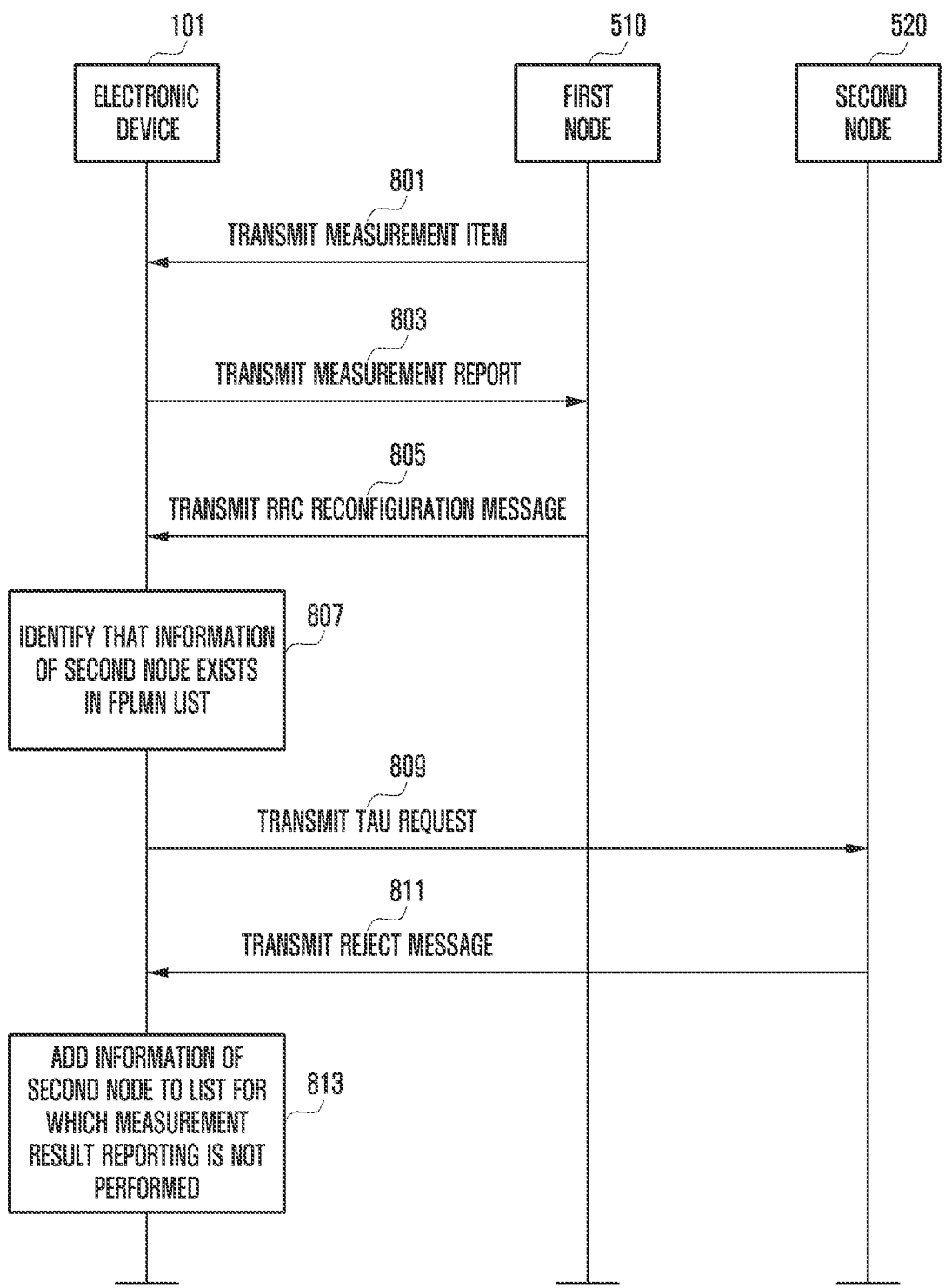
FIG. 8 is a diagram illustrating an embodiment in which an electronic device transmits a TAU request signal when a command of handover to a second node included in an FPLMN list is received according to an embodiment of the disclosure.

FIG. 8 is a diagram illustrating an embodiment in which an electronic device transmits a TAU request signal when a command of handover to a second node included in an FPLMN list is received according to an embodiment of the disclosure.

Referring to FIG. 8, a first node (e.g., the first node 510 in FIG. 5A) may transmit a measurement item to an electronic device (e.g., the electronic device 101 in FIG. 5A), in operation 801.

The electronic device 101 may be connected to the first node 510 and perform data transmission and/or reception through a first cellular communication. The electronic device 101 may perform data transmission and/or reception through the first cellular communication, and then may be switched to an idle state of the first cellular communication or maintain a connected state.

The electronic device 101 may receive a measurement configuration from the cellular network 500 in a state (e.g., RRC connected state) of being connected to the first node 510. The measurement configuration may be included in an RRC reconfiguration message. The measurement configuration may include a measurement object including identification information of a neighboring node and a frequency band to be measured by the electronic device 101, a report configuration including a condition for reporting, by the electronic device 101, the quality of a signal measured based on the measurement object, and/or measurement identification information (measurement Id) including identification information of a result of measuring the quality of the signal and the measurement object.

The electronic device 101 may transmit a measurement report to the first node 510, in operation 803.

The electronic device 101 may receive a signal broadcast by a neighboring node (e.g., the second node 520) through the frequency band included in the measurement object, and measure the quality of the signal. The electronic device 101 may identify that the quality of the signal broadcast by the second node 520 satisfies a condition, included in the report configuration, for reporting the quality of a signal, and transmit a measurement report including the quality of the signal broadcast by the second node 520, to the first node 510 or the cellular network 500.

The first node 510 may transmit an RRC reconfiguration message to the electronic device 101, in operation 805.

The first node 510 or the cellular network 500 having received the measurement report may transmit a command of handover to the second node 520, which is a neighboring node, to the electronic device 101 according to the quality of the signal broadcast by the node included in the measurement report. The electronic device 101 may perform a series of operations (e.g., initial access) for connecting to the second node 520, based on reception of the command of handover. The RRC reconfiguration message may include a handover command indicating to perform handover to the second node 520.

According to an embodiment, the second node 520 is a node shared by multiple cellular operators, and may be a node included in a shared network. When the second node 520 is a node commonly used by multiple cellular network operators, the second node 520 may be a node which is able to access core networks 531 and 533 (e.g., the core network 430 in FIG. 4A) operated by the multiple cellular network operators, respectively. The second node 520 may broadcast system information (e.g., system information block (SIB) 1) including identification information (e.g., public land mobile networks (PLMNs)) of the multiple cellular network operators.

A signal transmitted or broadcast by the second node 520 may be system information of the second node 520. The system information broadcast by the second node 520 may include various information. The system information may include SIB 1 defined in 3GPP TS. 36.331 v15.6. SIB 1 may include information on the second node 520. For example, SIB 1 is information required for connection with the second node 520, and may include physical identification information (physical cell identification (PCI)) of the second node 520 and a frequency band used by the second node 520.

The electronic device 101 may identify whether information of the second node 520 included in the system information is included in an FPLMN list, before performing handover to the second node 520.

The electronic device 101 may, based on identification that the system information broadcast by the second node 520 includes identification information of multiple cellular network operators, identify whether information of the second node 520 included in the system information is included in the FPLMN list, in operation 807.

The electronic device 101 may identify that the information of the second node 520 is included in the FPLMN list. The electronic device 101 may transmit a tracking area update (TAU) request message to the second node 520, in operation 809.

The electronic device 101 may identify that the information of the second node 520 is included in the FPLMN list. The electronic device 101 may transmit a signal requesting a particular service to the second node 520, based on identification that the information of the second node 520 is included in the FPLMN list.

The particular service may include a service performable through the second node 520. According to an embodiment, the particular service may include tracking area update (TAU) by which the location of the electronic device 101 registered in the cellular network 500 is updatable. When the particular service is TAU, the signal requesting the particular service may be a tracking area update (TAU) request signal. According to an embodiment, the particular service may include location registration that is a service by which the electronic device 101 is registered in the cellular network 500 according to the movement of the electronic device 101. When the particular service is location registration, the signal requesting the particular service may be a location registration request signal.

The electronic device 101 may not abort handover to the second node 520, transmit a signal requesting a particular service to the second node 520, and then according to whether a response message corresponding to the signal is received, determine whether to abort handover to the second node 520.

The second node 520 may transmit a reject message corresponding to the TAU request signal to the electronic device 101, in operation 811.

When the electronic device 101 fails to receive an accept message corresponding to the signal requesting the particular service, or when a reject message is received, the electronic device 101 may not perform handover to the second node 520.

A situation where the electronic device 101 has failed to receive an accept message corresponding to the signal requesting the particular service from the second node 520 or has received a reject message may indicate a situation where the electronic device 101 is unable to access the second node 520 and/or perform cellular communication through the second node 520. That is, a situation where identification information of the second node 520 is included in the FPLMN list may indicate a situation where the electronic device 101 is actually forbidden to access the second node 520, rather than indicating temporarily error of the second node 520. Therefore, when the electronic device 101 fails to receive an accept message corresponding to the signal requesting the particular service from the second node 520, or when a reject message is received, the electronic device 101 may not perform handover to the second node 520.

The electronic device 101 may add the information of the second node 520 to a list for which measurement result reporting is not performed, in operation 813.

When the electronic device 101 fails to receive an accept message corresponding to the signal requesting the particular service, or when a reject message is received, the electronic device 101 may switch from an RRC connected state to an RRC idle state. While switching from the RRC connected state to the RRC idle state, the electronic device 101 may not transmit, to the first node 510 for a designated time interval, a result of measuring the quality of a signal broadcast by the second node 520. According to an embodiment, the electronic device 101 may switch from the RRC idle state to the RRC connected state, and then receive a measurement configuration including the information of the second node 520 from the first node 510. Even when the electronic device 101 measures the quality of a signal broadcast by the second node 520, based on the information of the second node 520, the electronic device 101 does not transmit, to the first node 510 for a designated time interval, a result of measuring the quality of the signal broadcast by the second node 520. Therefore, repetition of transmission of a signal requesting a particular service to the second node 520 and reception of a reject message may be prevented.

While switching from the RRC connected state to the RRC idle state, in order not to transmit, to the first node 510 for a designated time interval, a result of measuring the quality of a signal broadcast by the second node 520, the electronic device 101 may add the information of the second node 520 to a list of a node for which the result of quality measurement is not reported for a first time interval. In a case where the information of the second node 520 is added in a list of a node for which the result of quality measurement is not reported for the first time interval, even when the electronic device 101 measures the quality of a signal broadcast by the second node 520, based on the information of the second node 520, the electronic device 101 does not transmit, to the first node 510 for the first time interval, a result of measuring the quality of the signal broadcast by the second node 520. Therefore, repetition of transmission of a signal requesting a particular service to the second node 520 and reception of a reject message may be prevented.

The time interval for which a result of measuring the quality of a signal broadcast by the second node 520 is unreportable may vary according to the number of times that reception of an accept message corresponding to a particular service request has failed, or the number of times that a reject message has been received. The electronic device 101 may increase the time interval for which a result of measuring the quality of a signal broadcast by the second node 520 is unreportable, according to increase of the number of times that reception of an accept message corresponding to a particular service request has failed, or the number of times that a reject message has been received.

According to an embodiment, the electronic device 101 may configure the first time interval (e.g., 600 sec) as the time interval for which a result of measuring the quality of a signal broadcast by the second node 520 is unreportable in a situation where a reject message has been received for the first time after transmission of a particular service request signal to the second node 520. The electronic device 101 may configure a second time interval (e.g., 12 hours) longer than the first time interval as the time interval for which a result of measuring the quality of a signal broadcast by the second node 520 is unreportable in a situation where a reject message has been received again after transmission of a particular service request signal to the second node 520.

The electronic device 101 may add the information of the second node 520 to a list of a node for which the result of quality measurement is not reported for the first time interval, then identify that a designated time interval (e.g., the first time interval) has expired, and remove the information of the second node 520 from the list of the node for which the result of quality measurement is not reported for the first time interval. According to removal of the information of the second node 520 from the list of the node for which the result of quality measurement is not reported for the first time interval, the electronic device 101 may transmit, to the first node 510, a measurement report including the quality of a signal broadcast by the second node 520, and attempt to perform handover to the second node 520 again when a command of handover to the second node 520 is received.

Figure 9:
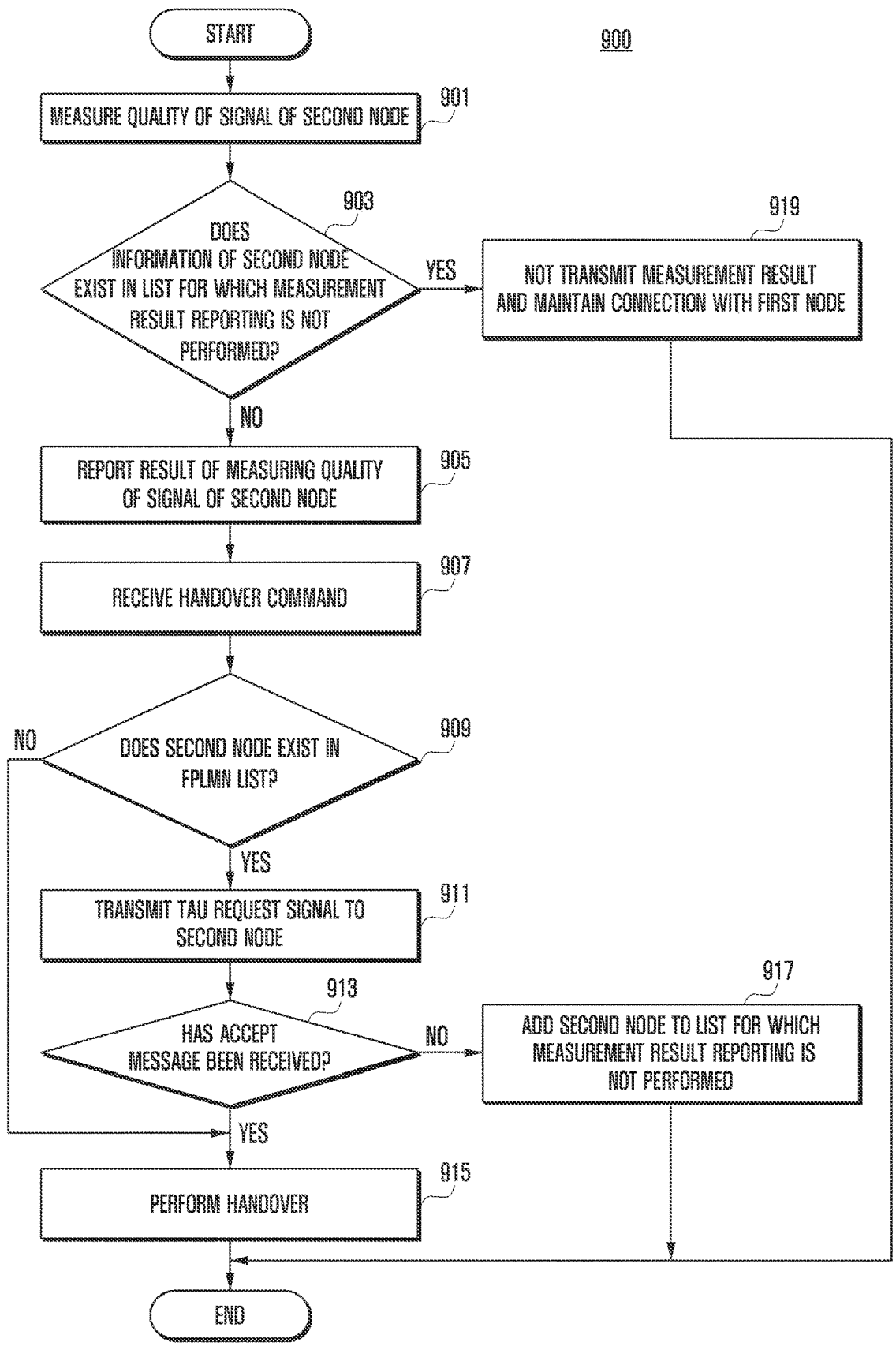
FIG. 9 is a diagram illustrating an embodiment in which, when a reject message corresponding to a TAU request signal is received, an electronic device adds a second node to a list for which measurement result reporting is not performed according to an embodiment of the disclosure.

FIG. 9 is a diagram illustrating an embodiment in which, when a reject message corresponding to a TAU request signal is received, an electronic device adds a second node to a list for which measurement result reporting is not performed according to an embodiment of the disclosure.

Referring to FIG. 9, diagram 900 illustrates that an electronic device (e.g., the electronic device 101 in FIG. 6) may measure the quality of a signal of a second node (e.g., the second node 520 in FIG. 5A), in operation 901.

The electronic device 101 may be connected to the first node 510 to use a first cellular communication or a second cellular communication. According to an embodiment, the electronic device 101 may receive an RRC reconfiguration message from the first node 510 after connection to the first node 510 is completed.

The RRC reconfiguration message may include a measurement configuration. The measurement configuration may include information for connecting the electronic device 101 to a node other than the first node 510. The measurement configuration may include a measurement object including identification information of a neighboring node and a frequency band to be measured by the electronic device 101, a report configuration including a condition for reporting, by the electronic device 101, the quality of a signal measured based on the measurement object, and/or measurement identification information (measurement Id) including identification information of a result of measuring the quality of the signal and the measurement object.

The electronic device 101 may receive a signal broadcast by a neighboring node (e.g., the second node 520) through the frequency band included in the measurement object, and measure the quality of the signal.

The electronic device 101 may identify whether information of the second node 520 exists in a list for which measurement result reporting is not performed, in operation 903.

The electronic device 101 may not perform quality measurement reporting for a node included in the list for which measurement result reporting is not performed.

In operation 919, when the information of the second node 520 exists in the list for which measurement result reporting is not performed (YES in operation 903), the electronic device 101 may not transmit a measurement result and maintain the connection with the first node 510.

In operation 905, when the information of the second node 520 does not exist in the list for which measurement result reporting is not performed (NO in operation 903), the electronic device 101 may transmit a measurement report including the quality of a signal broadcast by the second node 520 to the first node 510.

The electronic device 101 may identify that the quality of the signal broadcast by the second node 520 satisfies a condition, included in the report configuration, for reporting the quality of a signal, and transmit a measurement report including the quality of the signal broadcast by the second node 520, to the first node 510 or the cellular network 500.

The electronic device 101 may receive a handover command, in operation 907.

The first node 510 or the cellular network 500 having received the measurement report may transmit a command of handover to the second node 520, which is a neighboring node, to the electronic device 101 according to the quality of the signal broadcast by the node included in the measurement report. The electronic device 101 may perform a series of operations (e.g., initial access) for connecting to the second node 520, based on reception of the command of handover. The command of handover may be included in an RRC reconfiguration message.

The electronic device 101 may receive the command of the handover, and identify information of the second node 520 to which handover is to be performed, which is included in the command of handover. The information of the second node 520 may include information of a frequency band supported by the second node 520 and/or identification information of the second node 520.

The electronic device 101 may control the communication circuit 610 to receive a signal in the frequency band supported by the second node 520, and receive a signal transmitted or broadcast by the second node 520.

According to an embodiment, the second node 520 is a node shared by multiple cellular operators, and may be a node included in a shared network. When the second node 520 is a node commonly used by multiple cellular network operators, the second node 520 may be a node which is able to access core networks 531 and 533 (e.g., the core network 430 in FIG. 4A) operated by the multiple cellular network operators, respectively. The second node 520 may broadcast system information (e.g., system information block (SIB) 1) including identification information (e.g., public land mobile networks (PLMNs)) of the multiple cellular network operators.

A signal transmitted or broadcast by the second node 520 may be system information of the second node 520. The system information broadcast by the second node 520 may include various information. The system information may include SIB 1 defined in 3GPP TS. 36.331 v15.6. SIB 1 may include information on the second node 520. For example, SIB 1 is information required for connection with the second node 520, and may include physical identification information (physical cell identification (PCI)) of the second node 520 and a frequency band used by the second node 520.

The electronic device 101 may identify whether the second node 520 exists in an FPLMN list, in operation 909.

The electronic device 101 may identify whether information of the second node 520 included in the system information is included in the FPLMN list, before performing handover to the second node 520.

The electronic device 101 may, based on identification that the system information broadcast by the second node 520 includes identification information of multiple cellular network operators, identify whether information of the second node 520 included in the system information is included in the FPLMN list.

The electronic device 101 may perform handover to the second node 520, based on absence of the second node 520 in the FPLMN list (NO in operation 909).

The electronic device 101 may, in operation 911, transmit a TAU request signal to the second node 520, based on presence of the second node 520 in the FPLMN list (YES in operation 909).

The electronic device 101 may identify that the information of the second node 520 is included in the FPLMN list. The electronic device 101 may transmit a signal requesting a particular service to the second node 520, based on identification that the information of the second node 520 is included in the FPLMN list.

The particular service may include a service performable through the second node 520. According to an embodiment, the particular service may include tracking area update (TAU) by which the location of the electronic device 101 registered in the cellular network 500 is updatable. When the particular service is TAU, the signal requesting the particular service may be a tracking area update (TAU) request signal. According to an embodiment, the particular service may include location registration that is a service by which the electronic device 101 is registered in the cellular network 500 according to the movement of the electronic device 101. When the particular service is location registration, the signal requesting the particular service may be a location registration request signal.

The electronic device 101 may identify whether an accept message corresponding to the TAU request signal has been received from the second node 520, in operation 913.

The electronic device 101 may not abort handover to the second node 520, transmit a signal requesting a particular service to the second node 520, and then according to whether a response message corresponding to the signal is received, determine whether to abort handover to the second node 520.

The electronic device 101 may, in operation 915, perform handover to the second node 520, based on reception of the accept message corresponding to the TAU request signal (YES in operation 913).

A situation where the electronic device 101 has received an accept message corresponding to the signal requesting the particular service from the second node 520 may indicate a situation where the electronic device 101 is able to access the second node 520 and/or perform cellular communication through the second node 520. That is, a situation where identification information of the second node 520 is included in the FPLMN list may indicate a situation where the inclusion has occurred due to temporarily error of the second node 520. Therefore, the electronic device 101 may perform handover to the second node 520 according to reception of an accept message corresponding to the signal requesting the particular service from the second node 520, and according to completion of the handover to the second node 520, control the communication circuit 610 to perform cellular communication through the second node 520.

The electronic device 101 may determine to perform handover to the second node 520, and remove the identification information of the second node 520 from the FPLMN list. When the identification information of the second node 520 is removed from the FPLMN list, the electronic device 101 may be able to perform handover to the second node 520.

The electronic device 101 may, in operation 917, add the second node 520 to a list for which measurement result reporting is not performed, based on failure of reception of the accept message corresponding to the TAU request signal (NO in operation 913).

When the electronic device 101 fails to receive an accept message corresponding to the signal requesting the particular service, or when a reject message is received, the electronic device 101 may not perform handover to the second node 520.

A situation where the electronic device 101 has failed to receive an accept message corresponding to the signal requesting the particular service from the second node 520 or has received a reject message may indicate a situation where the electronic device 101 is unable to access the second node 520 and/or perform cellular communication through the second node 520. That is, a situation where identification information of the second node 520 is included in the FPLMN list may indicate a situation where the electronic device 101 is actually forbidden to access the second node 520, rather than indicating temporarily error of the second node 520. Therefore, when the electronic device 101 fails to receive an accept message corresponding to the signal requesting the particular service from the second node 520, or when a reject message is received, the electronic device 101 may not perform handover to the second node 520.

When the electronic device 101 fails to receive an accept message corresponding to the signal requesting the particular service, or when a reject message is received, the electronic device 101 may switch from an RRC connected state to an RRC idle state. While switching from the RRC connected state to the RRC idle state, the electronic device 101 may not transmit, to the first node 510 for a designated time interval, a result of measuring the quality of a signal broadcast by the second node 520. According to an embodiment, the electronic device 101 may switch from the RRC idle state to the RRC connected state, and then receive a measurement configuration including the information of the second node 520 from the first node 510. Even when the electronic device 101 measures the quality of a signal broadcast by the second node 520, based on the information of the second node 520, the electronic device 101 does not transmit, to the first node 510 for a designated time interval, a result of measuring the quality of the signal broadcast by the second node 520. Therefore, repetition of transmission of a signal requesting a particular service to the second node 520 and reception of a reject message may be prevented.

While switching from the RRC connected state to the RRC idle state, in order not to transmit, to the first node 510 for a designated time interval, a result of measuring the quality of a signal broadcast by the second node 520, the electronic device 101 may add the information of the second node 520 to a list of a node for which the result of quality measurement is not reported for a first time interval. In a case where the information of the second node 520 is added in a list of a node for which the result of quality measurement is not reported for the first time interval, even when the electronic device 101 measures the quality of a signal broadcast by the second node 520, based on the information of the second node 520, the electronic device 101 does not transmit, to the first node 510 for the first time interval, a result of measuring the quality of the signal broadcast by the second node 520. Therefore, repetition of transmission of a signal requesting a particular service to the second node 520 and reception of a reject message may be prevented.

The time interval for which a result of measuring the quality of a signal broadcast by the second node 520 is unreportable may vary according to the number of times that reception of an accept message corresponding to a particular service request has failed, or the number of times that a reject message has been received. The electronic device 101 may increase the time interval for which a result of measuring the quality of a signal broadcast by the second node 520 is unreportable, according to increase of the number of times that reception of an accept message corresponding to a particular service request has failed, or the number of times that a reject message has been received.

According to an embodiment, the electronic device 101 may configure the first time interval (e.g., 600 sec) as the time interval for which a result of measuring the quality of a signal broadcast by the second node 520 is unreportable in a situation where a reject message has been received for the first time after transmission of a particular service request signal to the second node 520. The electronic device 101 may configure a second time interval (e.g., 12 hours) longer than the first time interval as the time interval for which a result of measuring the quality of a signal broadcast by the second node 520 is unreportable in a situation where a reject message has been received again after transmission of a particular service request signal to the second node 520.

The electronic device 101 may add the information of the second node 520 to a list of a node for which the result of quality measurement is not reported for the first time interval, then identify that a designated time interval (e.g., the first time interval) has expired, and remove the information of the second node 520 from the list of the node for which the result of quality measurement is not reported for the first time interval. According to removal of the information of the second node 520 from the list of the node for which the result of quality measurement is not reported for the first time interval, the electronic device 101 may transmit, to the first node 510, a measurement report including the quality of a signal broadcast by the second node 520, and attempt to perform handover to the second node 520 again when a command of handover to the second node 520 is received.

Figure 10:
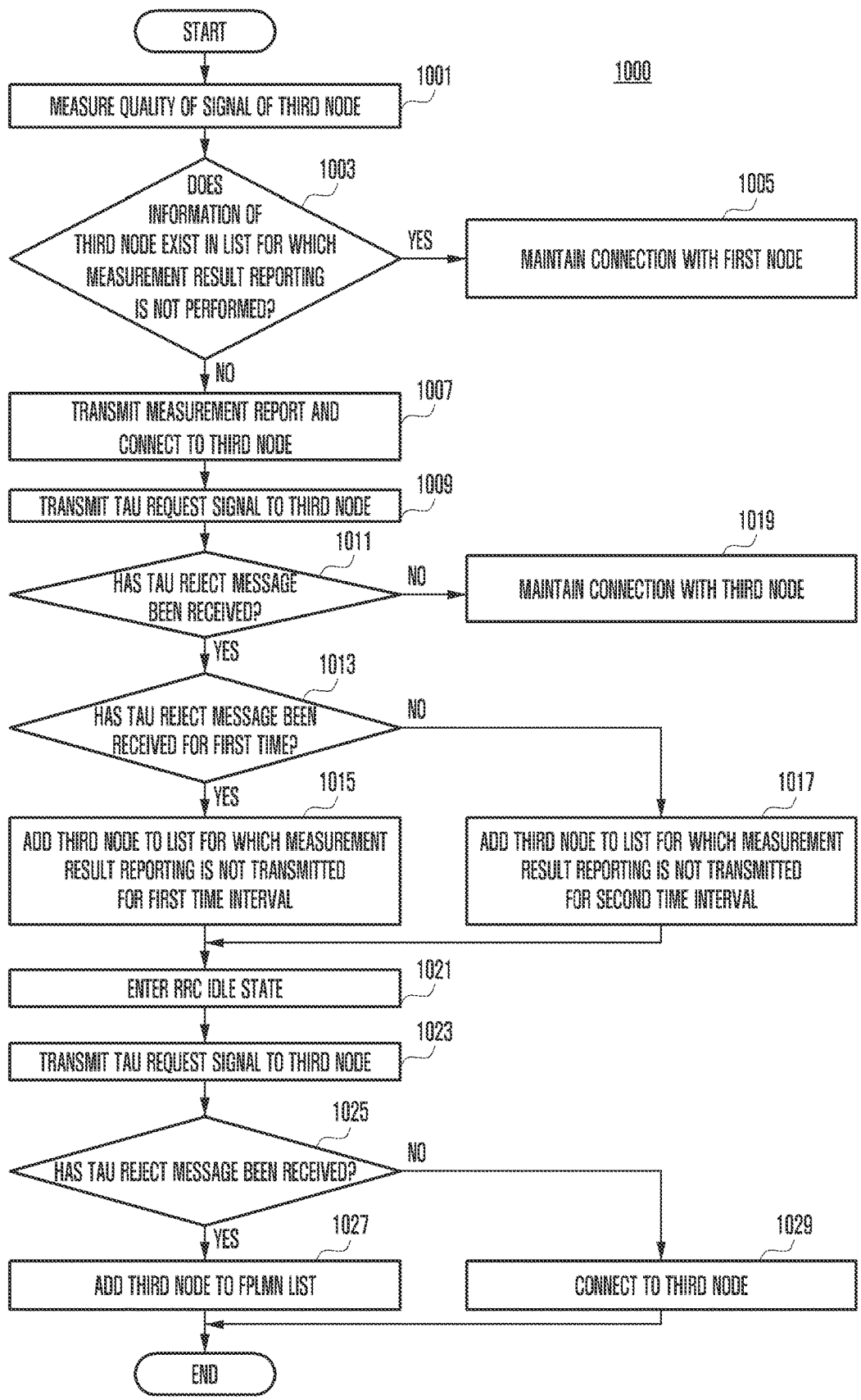
FIG. 10 is a diagram illustrating an embodiment in which, when a reject message corresponding to a TAU request signal is received, an electronic device adds a second node to a list for which measurement result reporting is not performed according to an embodiment of the disclosure.

FIG. 10 is a diagram illustrating an embodiment in which, when a reject message corresponding to a TAU request signal is received, an electronic device adds a second node to a list for which measurement result reporting is not performed according to an embodiment of the disclosure.

Referring to FIG. 10, diagram 1000 illustrates that an electronic device (e.g., the electronic device 101 in FIG. 6) may measure the quality of a signal of a third node, in operation 1001.

The electronic device 101 may be connected to the first node 510 to use a first cellular communication or a second cellular communication. According to an embodiment, the electronic device 101 may receive an RRC reconfiguration message from the first node 510 after connection to the first node 510 is completed.

The RRC reconfiguration message may include a measurement configuration. The measurement configuration may include information for connecting the electronic device 101 to a node other than the first node 510. The measurement configuration may include a measurement object including identification information of a neighboring node and a frequency band to be measured by the electronic device 101, a report configuration including a condition for reporting, by the electronic device 101, the quality of a signal measured based on the measurement object, and/or measurement identification information (measurement Id) including identification information of a result of measuring the quality of the signal and the measurement object.

The electronic device 101 may receive a signal broadcast by the third node, which is different from the second node 520, through the frequency band included in the measurement configuration received from the first node 510, and measure the quality of the signal.

The electronic device 101 may identify whether information of the third node exists in a list for which measurement result reporting is not performed, in operation 1003.

The electronic device 101 may not perform quality measurement reporting for a node included in the list for which measurement result reporting is not performed.

Based on presence of the information of the third node in the list for which measurement result reporting is not performed (YES in operation 1003), the electronic device 101 may maintain the connection with the first node 510, in operation 1005.

In operation 1007, based on absence of the information of the third node in the list for which measurement result reporting is not performed (NO in operation 1003), the electronic device 101 may transmit a measurement report to the first node 510 and connect to the third node.

The electronic device 101 may identify that the quality of the signal broadcast by the third node satisfies a condition, included in the report configuration, for reporting the quality of a signal, and transmit a measurement report including the quality of the signal broadcast by the third node, to the first node 510 or the cellular network 500.

The first node 510 or the cellular network 500 having received the measurement report may transmit a command of handover to the third node, which is a neighboring node, to the electronic device 101 according to the quality of the signal broadcast by the node included in the measurement report. The electronic device 101 may perform a series of operations (e.g., initial access) for connecting to the third node, based on reception of the command of handover. The command of handover may be included in an RRC reconfiguration message.

The electronic device 101 may receive the command of the handover, and identify information of the third node (not illustrated) to which handover is to be performed, which is included in the command of handover. The information of the third node may include information of a frequency band supported by the third node and/or identification information of the third node.

The electronic device 101 may control the communication circuit 610 to receive a signal in the frequency band supported by the third node, and receive a signal transmitted or broadcast by the third node.

According to an embodiment, the third node is a node shared by multiple cellular operators, and may be a node included in a shared network. When the third node is a node commonly used by multiple cellular network operators, the third node may be a node which is able to access core networks 531 and 533, the core network 430 in FIG. 4A) operated by the multiple cellular network operators, respectively. The third node may broadcast system information (e.g., system information block (SIB) 1) including identification information (e.g., public land mobile networks (PLMNs)) of the multiple cellular network operators.

The signal transmitted or broadcast by the third node may be system information of the third node. The system information broadcast by the third node may include various information. The system information may include SIB 1 defined in 3GPP TS. 36.331 v15.6. SIB 1 may include information on the third node. For example, SIB 1 is information required for connection with the third node, and may include physical identification information (physical cell identification (PCI)) of the third node and a frequency band used by the third node.

The electronic device 101 may identify whether information of the third node included in the system information is included in an FPLMN list, before performing handover to the third node.

The electronic device 101 may identify that the information of the third node is not included in the FPLMN list. The electronic device 101 may perform handover to the third node, based on identification that the information of the third node is not included in the FPLMN list.

The electronic device 101 may transmit a TAU request signal to the third node, in operation 1009.

The electronic device 101 may transmit a signal requesting a particular service to the third node according to completion of handover to the third node.

The particular service may include a service performable through the third node. According to an embodiment, the particular service may include tracking area update (TAU) by which the location of the electronic device 101 registered in the cellular network 500 is updatable. When the particular service is TAU, the signal requesting the particular service may be a tracking area update (TAU) request signal.

The electronic device 101 may identify whether a TAU reject message corresponding to the TAU request signal has been received, in operation 1011.

The electronic device 101 may, in operation 1019, maintain the connection with the third node, based on that the TAU reject message has not been received from the third node (NO in operation 1011).

The electronic device 101 may transmit a TAU request signal, and then according to reception of a TAU accept message from the third node, maintain connection with the third node.

The electronic device 101 may identify whether the TAU reject message has been received from the third node for the first time, in operation 1013, based on that the TAU reject message has been received from the third node (YES in operation 1011).

In operation 1015, based on that the TAU reject message has been received from the third node for the first time (YES in operation 1013), the electronic device 101 may add the third node to a list for which measurement result reporting is not performed for a first time interval.

While switching from an RRC connected state to an RRC idle state, the electronic device 101 may not transmit, to the first node 510 for a designated time interval, a result of measuring the quality of a signal broadcast by the third node. According to an embodiment, the electronic device 101 may switch from the RRC idle state to the RRC connected state, and then receive a measurement configuration including the information of the third node from the first node 510. Even when the electronic device 101 measures the quality of a signal broadcast by the third node, based on the information of the third node, the electronic device 101 does not transmit, to the first node 510 for a designated time interval, a result of measuring the quality of the signal broadcast by the third node. Therefore, repetition of transmission of a signal requesting a particular service to the third node and reception of a reject message may be prevented.

While switching from the RRC connected state to the RRC idle state, in order not to transmit, to the first node 510 for a designated time interval, a result of measuring the quality of a signal broadcast by the third node, the electronic device 101 may add the information of the third node to a list of a node for which the result of quality measurement is not reported for the first time interval. In a case where the information of the third node is added in a list of a node for which the result of quality measurement is not reported for the first time interval, even when the electronic device 101 measures the quality of a signal broadcast by the third node, based on the information of the third node, the electronic device 101 does not transmit, to the first node 510 for the first time interval, a result of measuring the quality of the signal broadcast by the third node. Therefore, repetition of transmission of a signal requesting a particular service to the third node and reception of a reject message may be prevented.

In operation 1017, based on that the TAU reject message has not been received from the third node for the first time (NO in operation 1013), the electronic device 101 may add the third node to a list for which measurement result reporting is not performed for a second time interval.

The time interval for which a result of measuring the quality of a signal broadcast by the third node is unreportable may vary according to the number of times that reception of an accept message corresponding to a particular service request has failed, or the number of times that a reject message has been received. The electronic device 101 may increase the time interval for which a result of measuring the quality of a signal broadcast by the third node is unreportable, according to increase of the number of times that reception of an accept message corresponding to a particular service request has failed, or the number of times that a reject message has been received.

According to an embodiment, the electronic device 101 may configure the first time interval (e.g., 600 sec) as the time interval for which a result of measuring the quality of a signal broadcast by the third node is unreportable in a situation where a reject message has been received for the first time after transmission of a particular service request signal to the third node. The electronic device 101 may configure a second time interval (e.g., 12 hours) longer than the first time interval as the time interval for which a result of measuring the quality of a signal broadcast by the third node is unreportable in a situation where a reject message has been received again after transmission of a particular service request signal to the third node.

The electronic device 101 may enter an RRC idle state, in operation 1021.

The electronic device 101 may transmit a TAU request signal to the third node again, in operation 1023.

The electronic device 101 may transmit a measurement report including the quality of a signal broadcast by the third node to the first node 510 according to expiration of the designated time interval (e.g., the first time interval or the second time interval). The first node 510 may transmit a handover command to indicate handover to the third node to the electronic device 101 according to the quality of the signal.

The electronic device 101 may perform handover to the third node according to reception of the handover command, and transmit a signal requesting TAU to the third node.

The electronic device 101 may identify whether a TAU reject message has been received from the third node, in operation 1025.

The electronic device 101 may, in operation 1027, add the third node to the FPLMN list, based on that the TAU reject message has been received from the third node (YES in operation 1025).

When the third node transmits a reject message corresponding to a signal requesting a particular service, the electronic device 101 may release the connection with the third node. The electronic device 101 may add the information of the third node to the FPLMN list in the RRC idle state.

The electronic device 101 may, in operation 1029, be connected to the third node, based on that the TAU reject message has not been received from the third node (NO in operation 1025).

When the third node transmits an accept message corresponding to the signal requesting the particular service, the electronic device 101 may maintain the connection with the third node.

Figure 11:
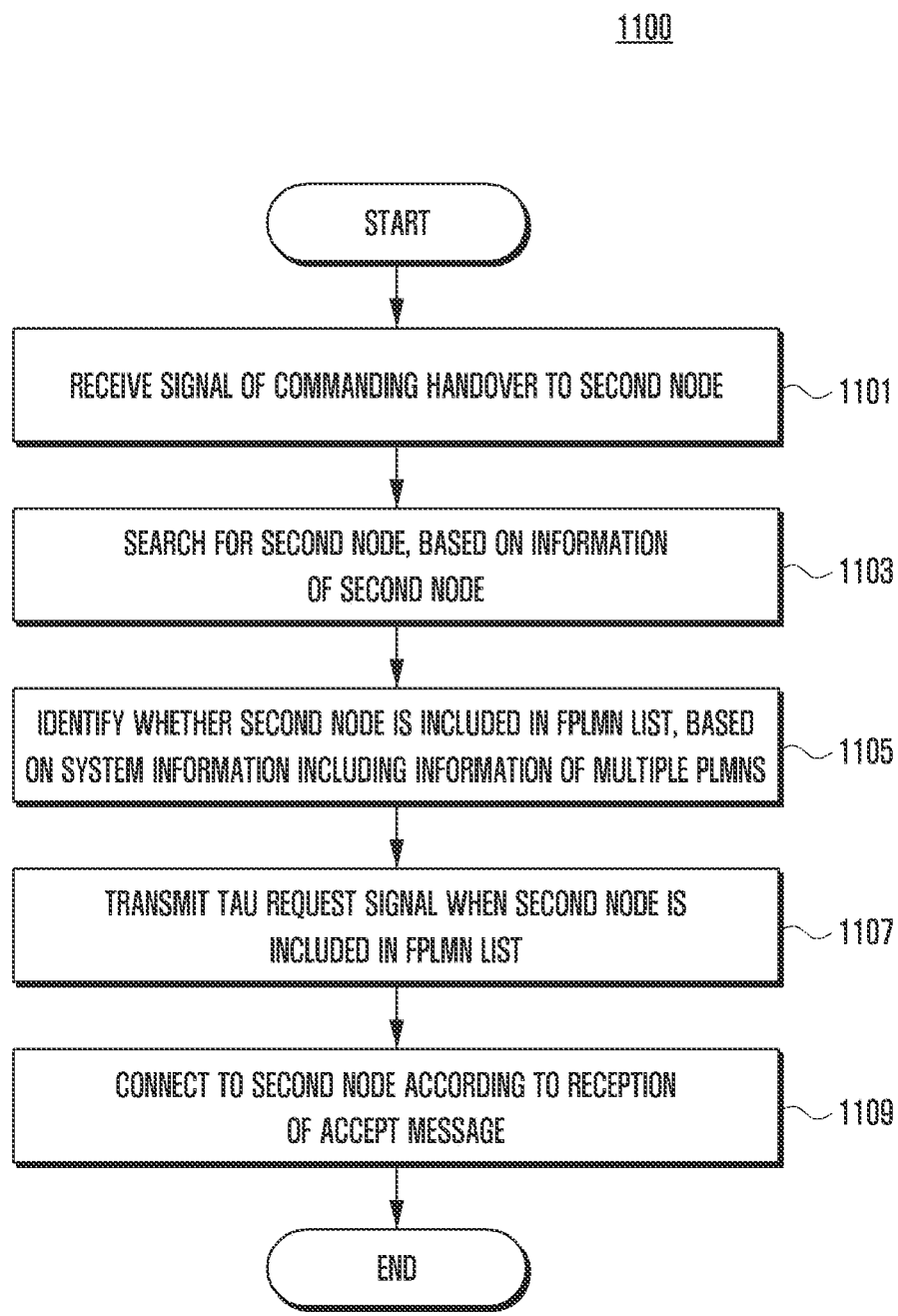
FIG. 11 is an operation flowchart illustrating an operation method of an electronic device according to an embodiment of the disclosure.

FIG. 11 is an operation flowchart illustrating an operation method of an electronic device according to an embodiment of the disclosure.

Referring to FIG. 11, operation flowchart 1100 illustrates that an electronic device (e.g., the electronic device 101 in FIG. 6) may receive a signal of commanding handover to a second node (e.g., the second node 520 in FIG. 5A) from a first node (e.g., the first node 510 in FIG. 5A), in operation 1101.

The electronic device 101 may be connected to the first node 510 to use a first cellular communication or a second cellular communication. According to an embodiment, the electronic device 101 may receive an RRC reconfiguration message from the first node 510 after connection to the first node 510 is completed.

The RRC reconfiguration message may include a measurement configuration. The measurement configuration may include information for connecting the electronic device 101 to a node other than the first node 510. The measurement configuration may include a measurement object including identification information of a neighboring node and a frequency band to be measured by the electronic device 101, a report configuration including a condition for reporting, by the electronic device 101, the quality of a signal measured based on the measurement object, and/or measurement identification information (measurement Id) including identification information of a result of measuring the quality of the signal and the measurement object.

The electronic device 101 may receive a signal broadcast by a neighboring node (e.g., the second node 520) through the frequency band included in the measurement object, and measure the quality of the signal.

The electronic device 101 may identify that the quality of the signal broadcast by the second node 520 satisfies a condition, included in the report configuration, for reporting the quality of a signal, and transmit a measurement report including the quality of the signal broadcast by the second node 520, to the first node 510 or the cellular network 500.

The first node 510 or the cellular network 500 having received the measurement report may transmit a command of handover to the second node 520, which is a neighboring node, to the electronic device 101 according to the quality of the signal broadcast by the node included in the measurement report. The electronic device 101 may perform a series of operations (e.g., initial access) for connecting to the second node 520, based on reception of the command of handover. The command of handover may be included in an RRC reconfiguration message.

The electronic device 101 may receive the command of the handover, and identify information of the second node 520 to which handover is to be performed, which is included in the command of handover. The information of the second node 520 may include information of a frequency band supported by the second node 520 and/or identification information of the second node 520.

The electronic device 101 may search for the second node 520, based on the information of the second node 520, in operation 1103.

The electronic device 101 may control the communication circuit 610 to receive a signal in the frequency band supported by the second node 520, and receive a signal transmitted or broadcast by the second node 520.

According to an embodiment, the second node 520 is a node shared by multiple cellular operators, and may be a node included in a shared network. When the second node 520 is a node commonly used by multiple cellular network operators, the second node 520 may be a node which is able to access core networks 531 and 533 (e.g., the core network 430 in FIG. 4A) operated by the multiple cellular network operators, respectively. The second node 520 may broadcast system information (e.g., system information block (SIB) 1) including identification information (e.g., public land mobile networks (PLMNs)) of the multiple cellular network operators.

The electronic device 101 may, in operation 1105, identify whether the second node is included in an FPLMN list, based on system information including information of multiple PLMNs, which has been transmitted by the second node 520.

A signal transmitted or broadcast by the second node 520 may be system information of the second node 520. The system information broadcast by the second node 520 may include various information. The system information may include SIB 1 defined in 3GPP TS. 36.331 v15.6. SIB 1 may include information on the second node 520. For example, SIB 1 is information required for connection with the second node 520, and may include physical identification information (physical cell identification (PCI)) of the second node 520 and a frequency band used by the second node 520.

The electronic device 101 may identify whether information of the second node 520 included in the system information is included in the FPLMN list, before performing handover to the second node 520.

The electronic device 101 may, based on identification that the system information broadcast by the second node 520 includes identification information of multiple cellular network operators, identify whether information of the second node 520 included in the system information is included in the FPLMN list.

The electronic device 101 may, in operation 1107, transmit a TAU request signal to the second node 520 when the second node is included in the FPLMN list.

The electronic device 101 may identify that the information of the second node 520 is included in the FPLMN list. The electronic device 101 may transmit a signal requesting a particular service to the second node 520, based on identification that the information of the second node 520 is included in the FPLMN list.

The particular service may include a service performable through the second node 520. According to an embodiment, the particular service may include tracking area update (TAU) by which the location of the electronic device 101 registered in the cellular network 500 is updatable. When the particular service is TAU, the signal requesting the particular service may be a tracking area update (TAU) request signal. According to an embodiment, the particular service may include location registration that is a service by which the electronic device 101 is registered in the cellular network 500 according to the movement of the electronic device 101. When the particular service is location registration, the signal requesting the particular service may be a location registration request signal.

The electronic device 101 may not abort handover to the second node 520, transmit a signal requesting a particular service to the second node 520, and then according to whether a response message corresponding to the signal is received, determine whether to abort handover to the second node 520.

The electronic device 101 may, in operation 1109, connect to the second node 520 according to reception of an accept message from the second node 520.

The electronic device 101 may perform handover to the second node 520 when an accept message corresponding to the TAU request signal is received.

A situation where the electronic device 101 has received an accept message corresponding to the TAU request signal from the second node 520 may indicate a situation where the electronic device 101 is able to access the second node 520 and/or perform cellular communication through the second node 520. That is, a situation where identification information of the second node 520 is included in the FPLMN list may indicate a situation where the inclusion has occurred due to temporarily error of the second node 520. Therefore, the electronic device 101 may perform handover to the second node 520 according to reception of an accept message corresponding to the TAU request signal from the second node 520, and according to completion of the handover to the second node 520, control the communication circuit 610 to perform cellular communication through the second node 520.

The electronic device 101 may determine to perform handover to the second node 520, and remove the identification information of the second node 520 from the FPLMN list. When the identification information of the second node 520 is removed from the FPLMN list, the electronic device 101 may be able to perform handover to the second node 520.

When the electronic device 101 fails to receive an accept message corresponding to the TAU request signal, or when a reject message is received, the electronic device 101 may not perform handover to the second node 520.

A situation where the electronic device 101 has failed to receive an accept message corresponding to the TAU request signal from the second node 520 or has received a reject message may indicate a situation where the electronic device 101 is unable to access the second node 520 and/or perform cellular communication through the second node 520. That is, a situation where identification information of the second node 520 is included in the FPLMN list may indicate a situation where the electronic device 101 is actually forbidden to access the second node 520, rather than indicating temporarily error of the second node 520. Therefore, when the electronic device 101 fails to receive an accept message corresponding to the TAU request signal from the second node 520, or when a reject message is received, the electronic device 101 may not perform handover to the second node 520.

Figure 12:
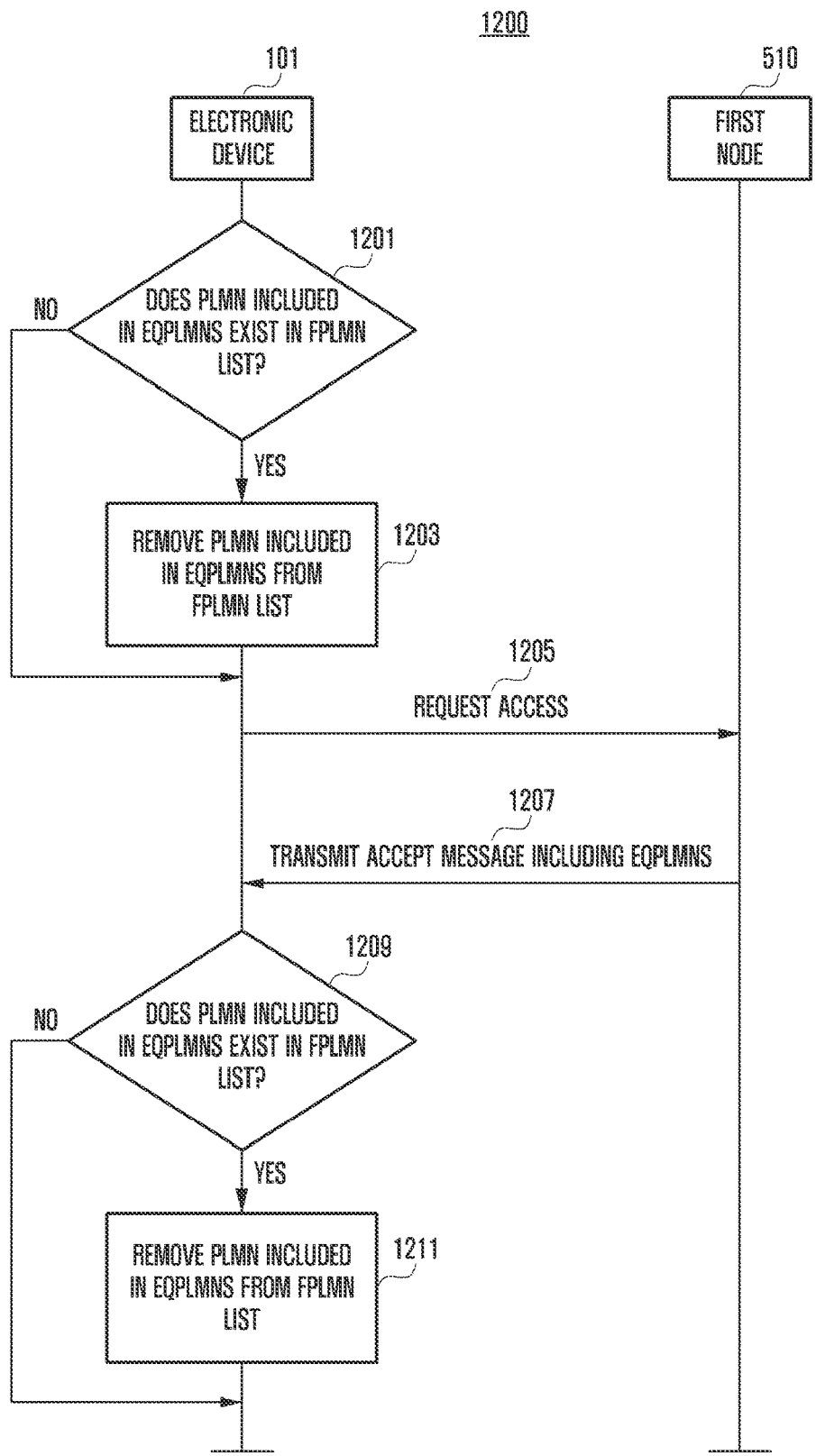
FIG. 12 is a diagram illustrating an embodiment in which an electronic device removes a PLMN included in eqPLMNs from an FPLMN list and/or is prevented from adding same thereto according to an embodiment of the disclosure.

FIG. 12 is a diagram illustrating an embodiment in which an electronic device removes a PLMN included in eqPLMNs from an FPLMN list and/or is prevented from adding same thereto according to an embodiment of the disclosure.

As described above, the electronic device 101 may be restricted from accessing a node included in an FPLMN list. Therefore, the electronic device 101 may remove, from the FPLMN list, a node added against the intent of a cellular network (e.g., the cellular network 500 in FIG. 5A), thereby performing a series of operations of smoothly accessing a node that the electronic device 101 has been able to access.

Referring to FIG. 12, diagram 1200 illustrates that an electronic device 101 may identify whether a PLMN included in eqPLMNs exists in an FPLMN list, in operation 1201.

The electronic device 101 may identify whether a PLMN included in eqPLMNs exists in an FPLMN list, after the electronic device 101 is booted.

An eqPLMN list may indicate a list of a PLMN that is different from a PLMN (or the PLMN of a cellular network including the first node 510) to which the electronic device 101 is currently connected (or registered in), but may be treated as equivalent to the currently connected (or registered) PLMN. That is, identification information of a cellular network included in the eqPLMN list may indicate identification information of a cellular network to which the electronic device 101 is able to access.

The electronic device 101 may, in operation 1203, remove the PLMN included in the eqPLMNs from the FPLMN list when the PLMN included in the eqPLMNs exists in the FPLMN list (YES in operation 1201).

The electronic device 101 may remove identification information included in the equivalent PLMN (eqPLMN) list received from the first node 510, from the FPLMN list. The electronic device 101 may remove identification information included in the equivalent PLMN (eqPLMN) list received from the first node 510, from the FPLMN list, thereby resolving a cellular network included in the eqPLMN list being inaccessible.

While performing an operation of removing the identification information included in the eqPLMN list from the FPLMN list or after performing an operation of removing the identification information included in the eqPLMN list from the FPLMN list, the electronic device 101 may add the PLMN included in the eqPLMNs to an EHPLMN list.

An equivalent home public land mobile network (EHPLMN) may indicate a list of an HPLMN that is different from an HPLMN (or the HPLMN of a cellular network including the first node 510) to which the electronic device 101 is currently connected (or registered in), but may be treated as equivalent to the currently connected (or registered) HPLMN. In 3GPP, a node included in EHPLMNs is defined not to be added to an FPLMN list. Therefore, the electronic device 101 may add a PLMN included in eqPLMNs to EHPLMNs, thereby preventing the PLMN included in the eqPLMNs from being added to an FPLMN list.

The electronic device 101 may transmit an access request signal to the first node 510, in operation 1205, when the PLMN included in the eqPLMNs does not exist in the FPLMN list (NO in operation 1201) or after operation 1203.

The first node 510 may transmit an accept message including eqPLMNs to the electronic device 101, in operation 1207.

The electronic device 101 may identify whether a PLMN included in the eqPLMNs received in operation 1207 exists in the FPLMN list, in operation 1209.

An eqPLMN list may indicate a list of a PLMN that is different from a PLMN (or the PLMN of a cellular network including the first node 510) to which the electronic device 101 is currently connected (or registered in), but may be treated as equivalent to the currently connected (or registered) PLMN. That is, identification information of a cellular network included in the eqPLMN list may indicate identification information of a cellular network to which the electronic device 101 is able to access.

The electronic device 101 may, in operation 1211, remove the PLMN included in the eqPLMNs from the FPLMN list when the PLMN included in the eqPLMNs exists in the FPLMN list (YES in operation 1209). The electronic device may refrain from performing operation 1211 based on the PLMN included in the eqPLMNs not existing in the FPLMN list (NO in operation 1209).

An equivalent home public land mobile network (EHPLMN) may indicate a list of an HPLMN that is different from an HPLMN (or the HPLMN of a cellular network including the first node 510) to which the electronic device 101 is currently connected (or registered in), but may be treated as equivalent to the currently connected (or registered) HPLMN. In 3GPP, a node included in EHPLMNs is defined not to be added to an FPLMN list. Therefore, the electronic device 101 may add a PLMN included in eqPLMNs to EHPLMNs, thereby preventing the PLMN included in the eqPLMNs from being added to an FPLMN list.

An electronic device according to an embodiment may include a memory configured to store a forbidden public land mobile network (FPLMN) list including a node to which access of the electronic device is blocked. The electronic device may include a communication circuit. The electronic device may include a communication processor. The communication processor may receive, through a first node, a handover command signal transmitted by a cellular network. The communication processor may search for a second node to which handover is to be performed, based on information of the second node included in the handover command signal. The communication processor may identify whether the second node is included in the FPLMN list, based on system information which is broadcast by the second node and includes information of multiple public land mobile networks (PLMNs). The communication processor may transmit a TAU request signal to the second node in case that the second node is included in the FPLMN list. The communication processor may be configured to connect to the second node according to reception of an accept message corresponding to the TAU request signal.

In the electronic device according to an embodiment, the communication processor may be configured to, in case that reception of the accept message fails, not to transmit, to the first node, a result of measuring a quality of a signal broadcast by the second node.

In the electronic device according to an embodiment, the communication processor may be configured to, in case that reception of the accept message fails, add the second node to a list of a node for which reporting of a quality measurement result is not performed for a first time interval.

In the electronic device according to an embodiment, the communication processor may be configured to, according to expiration of the designated time interval, remove the second node from the list of the node for which reporting of the quality measurement result is not performed.

In the electronic device according to an embodiment, the communication processor may search for a third node included in a measurement object received from the first node. The communication processor may measure a quality of the third node, based on system information which is broadcast by the third node and includes information of multiple public land mobile networks (PLMNs). The communication processor may transmit a TAU request signal to the third node, based on that the third node is not included in the list of the node for which reporting of the quality measurement result is not performed for the designated time interval. The communication processor may be configured to, based on failure of reception of an accept message corresponding to the TAU request signal, add the third node to the list of the node for which reporting of the quality measurement result is not performed for the designated time interval.

In the electronic device according to an embodiment, the communication processor may be configured to change the designated time interval, based on the number of times that reception of the accept message corresponding to the TAU request signal has failed.

In the electronic device according to an embodiment, the communication processor may transmit a TAU request signal to the third node in an RRC idle state of the electronic device. The communication processor may be configured to, based on failure of reception of an accept message corresponding to the TAU request signal, add the third node to the FPLMN list.

In the electronic device according to an embodiment, the communication processor may be configured to, in case that the accept message is received, remove the second node from the FPLMN list.

In the electronic device according to an embodiment, the communication processor may be configured to remove, from the FPLMN list, a node included in an equivalent PLMN (eqPLMN) received in a procedure of accessing the first node or a procedure of transmitting TAU to the first node.

In the electronic device according to an embodiment, the second node may be a node capable of accessing multiple core networks.

An operation method of an electronic device according to an embodiment may include receiving, through a first node, a handover command signal transmitted by a cellular network. The operation method of the electronic device may include searching for a second node to which handover is to be performed, based on information of the second node included in the handover command signal. The operation method of the electronic device may include identifying whether the second node is included in an FPLMN list including a node to which access of the electronic device is blocked, based on system information which is broadcast by the second node and includes information of multiple public land mobile networks (PLMNs). The operation method of the electronic device may include, in case that the second node is included in the FPLMN list, transmitting a TAU request signal to the second node. The operation method of the electronic device may include connecting to the second node according to reception of an accept message corresponding to the TAU request signal.

The operation method of the electronic device according to an embodiment may further include, in case that reception of the accept message fails, configuring not to transmit, to the first node, a result of measuring a quality of a signal broadcast by the second node.

The operation method of the electronic device according to an embodiment may further include, in case that reception of the accept message fails, adding the second node to a list of a node for which reporting of a quality measurement result is not performed for a first time interval.

The operation method of the electronic device according to an embodiment may further include, according to expiration of the designated time interval, removing the second node from the list of the node for which reporting of the quality measurement result is not performed.

The operation method of the electronic device according to an embodiment may further include searching for a third node included in a measurement object received from the first node. The operation method of the electronic device may further include measuring a quality of the third node, based on system information which is broadcast by the third node and includes information of multiple public land mobile networks (PLMNs). The operation method of the electronic device may further include transmitting a TAU request signal to the third node, based on that the third node is not included in the list of the node for which reporting of the quality measurement result is not performed for the designated time interval. The operation method of the electronic device may further include, based on failure of reception of an accept message corresponding to the TAU request signal, adding the third node to the list of the node for which reporting of the quality measurement result is not performed for the designated time interval.

The operation method of the electronic device according to an embodiment may further include changing the designated time interval, based on the number of times that reception of the accept message corresponding to the TAU request signal has failed.

The operation method of the electronic device according to an embodiment may further include transmitting a TAU request signal to the third node in an RRC idle state of the electronic device. The operation method of the electronic device may further include, based on failure of reception of an accept message corresponding to the TAU request signal, adding the third node to the FPLMN list.

The operation method of the electronic device according to an embodiment may further include, in case that the accept message is received, removing the second node from the FPLMN list.

The operation method of the electronic device according to an embodiment may further include removing, from the FPLMN list, a node included in an equivalent PLMN (eqPLMN) received in a procedure of accessing the first node or a procedure of transmitting TAU to the first node.

In the operation method of the electronic device according to an embodiment, the second node may be a node capable of accessing multiple core networks.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it denotes that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry." A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. The term "non-transitory" simply denotes that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
  a memory storing a forbidden public land mobile network (FPLMN) list including a node to which access of the electronic device is blocked;
  a communication circuit; and
  a communication processor,
  wherein the communication processor is configured to:
    receive, through a first node, a handover command signal transmitted by a cellular network,
    search for a second node to which a handover is to be performed, based on information of the second node included in the handover command signal,
    identify whether the second node is included in the FPLMN list, based on system information which is broadcast by the second node and includes information of multiple public land mobile networks (PLMNs),
    in case that the second node is included in the FPLMN list, transmit a first tracking area update (TAU) request signal to the second node, and
    connect to the second node according to reception of a first accept message corresponding to the first TAU request signal.

2. The electronic device of claim 1, wherein the communication processor is further configured to:
  in case that reception of the first accept message fails, refrain from transmitting, to the first node, a result of measuring a quality of a signal broadcast by the second node.

3. The electronic device of claim 1, wherein the communication processor is further configured to:
  in case that reception of the first accept message fails, add the second node to a list of a node for which reporting of a quality measurement result is not performed for a first time interval.

4. The electronic device of claim 3, wherein the communication processor is further configured to:
  based on the first time interval expiring, remove the second node from the list of the node for which reporting of the quality measurement result is not performed.

5. The electronic device of claim 3, wherein the communication processor is further configured to:
  search for a third node included in a measurement object received from the first node,
  measure a quality of the third node, based on system information which is broadcast by the third node and includes information of multiple PLMNs,
  transmit a second TAU request signal to the third node, based on the third node not being included in the list of the node for which reporting of the quality measurement result is not performed for the first time interval, and
  based on failure of reception of a second accept message corresponding to the second TAU request signal, add the third node to the list of the node for which reporting of the quality measurement result is not performed for the first time interval.

6. The electronic device of claim 5, wherein the communication processor is further configured to:
  change the first time interval, based on a number of times that reception of the second accept message corresponding to the second TAU request signal fails.

7. The electronic device of claim 5, wherein the communication processor is further configured to:
  transmit the second TAU request signal to the third node in a radio resource control (RRC) idle state of the electronic device, and
  based on failure of reception of the second accept message corresponding to the second TAU request signal, add the third node to the FPLMN list.

8. The electronic device of claim 1, wherein the communication processor is further configured to:

in case that the first accept message is received, remove the second node from the FPLMN list.

9. The electronic device of claim 1, wherein the communication processor is further configured to:
remove, from the FPLMN list, a node included in an equivalent PLMN (eqPLMN) received in a procedure of accessing the first node or a procedure of transmitting a TAU to the first node.

10. The electronic device of claim 1, wherein the second node is a node capable of accessing multiple core networks.

11. A method of operating an electronic device, the method comprising:
receiving, through a first node, a handover command signal transmitted by a cellular network;
searching for a second node to which a handover is to be performed, based on information of the second node included in the handover command signal;
identifying whether the second node is included in a forbidden public land mobile network (FPLMN) list including a node to which access of the electronic device is blocked, based on system information which is broadcast by the second node and includes information of multiple public land mobile networks (PLMNs);
in case that the second node is included in the FPLMN list, transmitting a first tracking area update (TAU) request signal to the second node; and
connecting to the second node according to reception of a first accept message corresponding to the first TAU request signal.

12. The method of claim 11, further comprising:
in case that reception of the first accept message fails, refraining from transmitting, to the first node, a result of measuring a quality of a signal broadcast by the second node.

13. The method of claim 11, further comprising:
in case that reception of the first accept message fails, adding the second node to a list of a node for which reporting of a quality measurement result is not performed for a first time interval.

14. The method of claim 13, further comprising:
based on the first time interval expiring, removing the second node from the list of the node for which reporting of the quality measurement result is not performed.

15. The method of claim 13, further comprising:
searching for a third node included in a measurement object received from the first node;
measuring a quality of the third node, based on system information which is broadcast by the third node and includes information of multiple PLMNs;
transmitting a second TAU request signal to the third node, based on the third node not being included in the list of the node for which reporting of the quality measurement result is not performed for the first time interval; and
based on failure of reception of a second accept message corresponding to the second TAU request signal, adding the third node to the list of the node for which reporting of the quality measurement result is not performed for the first time interval.

16. The method of claim 15, further comprising:
changing the first time interval, based on a number of times that reception of the second accept message corresponding to the second TAU request signal fails.

17. The method of claim 15, further comprising:
transmitting the second TAU request signal to the third node in a radio resource control (RRC) idle state of the electronic device; and
based on failure of reception of the second accept message corresponding to the second TAU request signal, adding the third node to the FPLMN list.

18. The method of claim 11, further comprising:
in case that the first accept message is received, removing the second node from the FPLMN list.

19. The method of claim 11, further comprising:
removing, from the FPLMN list, a node included in an equivalent PLMN (eqPLMN) received in a procedure of accessing the first node or a procedure of transmitting a TAU to the first node.

20. The method of claim 11, wherein the second node is a node capable of accessing multiple core networks.

* * * * *